US012266375B2

(12) United States Patent
Lecomte et al.

(10) Patent No.: US 12,266,375 B2
(45) **Date of Patent: *Apr. 1, 2025**

(54) ENCODER, DECODER AND METHOD FOR ENCODING AND DECODING AUDIO CONTENT USING PARAMETERS FOR ENHANCING A CONCEALMENT

(71) Applicant: Fraunhofer-Gesellschaft zur Foerderung der angewandten Forschung e.V., Munich (DE)

(72) Inventors: Jérémie Lecomte, Santa Clara, CA (US); Benjamin Schubert, Nuremberg (DE); Michael Schnabel, Geroldsgruen (DE); Martin Dietz, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/347,526

(22) Filed: Jul. 5, 2023

(65) Prior Publication Data

US 2024/0005935 A1 Jan. 4, 2024

Related U.S. Application Data

(63) Continuation of application No. 17/127,140, filed on Dec. 18, 2020, now Pat. No. 11,735,196, which is a (Continued)

(30) Foreign Application Priority Data

Aug. 27, 2014 (EP) .................................... 14182553
Apr. 17, 2015 (EP) .................................... 15164126

(51) Int. Cl.
*G10L 19/20* (2013.01)
*G10L 19/005* (2013.01)

(Continued)

(52) U.S. Cl.
CPC ............ *G10L 19/20* (2013.01); *G10L 19/005* (2013.01); *G10L 19/24* (2013.01); *G10L 25/93* (2013.01);

(Continued)

(58) Field of Classification Search
CPC ..... G10L 19/002; G10L 19/005; G10L 19/18; G10L 19/20; G10L 19/24
See application file for complete search history.

(56) References Cited

U.S. PATENT DOCUMENTS 5,414,796 A * 5/1995 Jacobs .................. G10L 19/012 704/E19.044
5,657,422 A 8/1997 Janiszewski et al.

(Continued)

FOREIGN PATENT DOCUMENTS

CN 101046964 A 10/2007
CN 101231849 A 7/2008

(Continued)

OTHER PUBLICATIONS

3GPP TS 26.447 5.4 Concealment operation related to MDCT modes, May 2014.

(Continued)

*Primary Examiner* — Douglas Godbold
(74) *Attorney, Agent, or Firm* — Perkins Coie LLP; Michael A. Glenn

(57) ABSTRACT

Described are an encoder for coding speech-like content and/or general audio content, wherein the encoder is configured to embed, at least in some frames, parameters in a bitstream, which parameters enhance a concealment in case an original frame is lost, corrupted or delayed, and a decoder for decoding speech-like content and/or general audio content, wherein the decoder is configured to use parameters which are sent later in time to enhance a concealment in case (Continued)

an original frame is lost, corrupted or delayed, as well as a method for encoding and a method for decoding.

10 Claims, 11 Drawing Sheets

Related U.S. Application Data continuation of application No. 15/442,980, filed on Feb. 27, 2017, now Pat. No. 10,878,830, which is a continuation of application No. PCT/EP2015/069348, filed on Aug. 24, 2015.

(51) Int. Cl.
*G10L 19/24* (2013.01)
*G10L 25/93* (2013.01)
*G10L 19/002* (2013.01)
*G10L 19/018* (2013.01)
*G10L 19/02* (2013.01)
*G10L 19/083* (2013.01)
*G10L 19/125* (2013.01)

(52) U.S. Cl.
CPC .......... *G10L 19/002* (2013.01); *G10L 19/018* (2013.01); *G10L 19/0212* (2013.01); *G10L 19/083* (2013.01); *G10L 19/125* (2013.01)

(56) References Cited

U.S. PATENT DOCUMENTS 6,188,980 B1 2/2001 Thyssen
6,757,654 B1 6/2004 Westerlund et al.
7,002,913 B2* 2/2006 Huang .................. G10L 19/005 370/254
7,013,267 B1* 3/2006 Huart .................... G10L 19/005 704/215
7,873,064 B1 1/2011 Li et al.
8,560,329 B2 10/2013 Zhang et al.
9,053,702 B2* 6/2015 Rajendran ............... G10L 19/04
9,280,982 B1 3/2016 Kushner
10,878,830 B2* 12/2020 Lecomte ................. G10L 19/24
11,735,196 B2* 8/2023 Lecomte ................. G10L 25/93 704/208
2002/0111912 A1* 8/2002 Hunter ................. H04N 21/262 705/52
2006/0271373 A1 11/2006 Khalil et al.
2007/0206645 A1 9/2007 Sundqvist et al.
2007/0239462 A1 10/2007 Makinen et al.
2008/0049795 A1 2/2008 Lakaniemi
2008/0147414 A1 6/2008 Son et al.
2008/0243495 A1* 10/2008 Anandakumar ...... G10L 19/005 704/214
2008/0294429 A1 11/2008 Su et al.
2009/0076805 A1 3/2009 Xu et al.
2009/0326930 A1 12/2009 Kawashima et al.
2010/0049511 A1 2/2010 Ma et al.
2010/0070271 A1 3/2010 Kovesi et al.
2010/0228542 A1 9/2010 Zhan
2011/0125505 A1* 5/2011 Vaillancourt ......... G10L 19/005 704/500
2011/0173011 A1* 7/2011 Geiger .................... G10L 19/04 704/500
2011/0196673 A1 8/2011 Sharma et al.
2012/0016668 A1* 1/2012 Gao ...................... G10L 21/038 704/E19.01
2012/0209604 A1 8/2012 Sehlstedt
2012/0239389 A1* 9/2012 Jeon ...................... G10L 19/005 704/207
2012/0271644 A1* 10/2012 Bessette .................. G10L 19/18 704/E19.035
2013/0144632 A1 6/2013 Sung
2013/0159005 A1* 6/2013 Kikuiri ................... G10L 19/18 704/500
2013/0185062 A1 7/2013 Krishnan et al.
2013/0185084 A1* 7/2013 Rajendran ............... G10L 19/04 704/500
2013/0191121 A1* 7/2013 Rajendran ............. G10L 19/005 704/229
2013/0332177 A1 12/2013 Helmrich et al.
2014/0188465 A1 7/2014 Choo et al.
2014/0201838 A1* 7/2014 Varsanyi ............... G06F 21/552 726/23
2014/0207445 A1* 7/2014 Gao ...................... G10L 19/005 704/220
2014/0249807 A1* 9/2014 Vaillancourt ........... G10L 19/08 704/207
2015/0106106 A1* 4/2015 Atti ........................... H04L 1/08 704/500
2015/0142452 A1* 5/2015 Sung ..................... G10L 19/005 704/500
2016/0225387 A1* 8/2016 Koppens ................. G10L 19/22
2017/0169833 A1* 6/2017 Lecomte ................. G10L 19/20
2017/0213561 A1* 7/2017 Faure .................... G10L 19/022

FOREIGN PATENT DOCUMENTS

| | | | |
|---|---|---|---|
| CN | 101437009 | A | 5/2009 |
| CN | 101364854 | B | 1/2011 |
| EP | 0424016 | A2 | 4/1991 |
| EP | 0985328 | B1 | 3/2006 |
| EP | 1850327 | A1 | 10/2007 |
| EP | 1088302 | B1 | 7/2008 |
| EP | 2107556 | A1 | 10/2009 |
| FR | 2830970 | A1 | 4/2003 |
| RU | 2419891 | C2 | 5/2011 |
| TW | 201337912 | A | 9/2013 |
| TW | 201413707 | A | 4/2014 |
| WO | 9847313 | A2 | 10/1998 |
| WO | 2007073604 | A1 | 7/2007 |
| WO | 2011042464 | A1 | 4/2011 |
| WO | 2011048094 | A1 | 4/2011 |
| WO | 2012110415 | A1 | 8/2012 |
| WO | 2012110448 | A1 | 8/2012 |
| WO | 2014046526 | A1 | 3/2014 |
| WO | 2014096279 | A1 | 6/2014 |

OTHER PUBLICATIONS

3GPP TS 26.290 "3rd Generation Partnership Project; Technical Specification Group Service and Systems Aspects; Audio codec processing functions; Extended Adaptive Multi-Rate—Wideband (AMR-WB+) codec; Transcoding functions (Relsease 9)", Sep. 23, 2009.

3rd Generation Partnership Project; Technical Specification Group Services and System Aspects; Codec for Enhanced Voice Services EVS Codec Error Concealment of Lost Packets (Release 12)3GPP TS 26.447 V0.0.1, May 2014.

"5.1.13.3 Signal Classification for FEC", 3GPP TS 26.445 V0.1.0 Codec for Enhanced Voice 1-15 Services EVS Codec Detailed Algorithmic Description: 3 Signal Classification for FEC, Aug. 2014, pp. 85-108.

"5.4 Concealment Operation Related to MDCT Modes", 3rd Generation Partnership Project (3GPP), Mobile Competence Center; 650, Route Des Lucioles F-06921 Sophia-Antipolis Cedex XP050839726, Jul. 30, 2014, pp. 38-78.

"5.5 Frame Erasure Concealment Side Information", 3rd Generation Partnership Project; Technical Specification Group Services and System Aspects; Codec for Enhanced Voice Services EVS Codec Detailed Algorithmic Description: 5.5 Frame Erasure Concealment Side Information, 3GPP TS 26.445 v0.1.0, Jul. 30, 2014, pp. 348-350.

"Codec for Enhanced Voice Services EVS Codec Error Concealment of Lost Packet", 3GPP TS 26.447 V.0.0.1 Codec for Enhanced Voice Services EVS Codec Error Concealment, Internet <URL:http://www.3gpp.org/ftp/tsg_sa, Jul. 30, 2014, pp. 8-9,12,14-15,38-40, File Name S4-140829\26447_010_s01_s53_4_23 S4-140829\26447_010_s01_end[searched: Apr. 17, 2018], Jul. 30, 2014, pp. 8-9,12,14-15,38-40.

(56) References Cited

OTHER PUBLICATIONS

"Universal Mobile Telecommunications Systems (UMTS); LTE; EVS Codec Detailed Algorithmic Description", Version 12.0.0 Release 12, Nov. 2014, pp. 1-627. (Year: 2014), Nov. 2014, pp. 1-627.
Atti, Venkatraman , et al., "Improved Error Resilience for VoLTE and VoIP with 3GPP EVS Channel Aware Coding", 2015 IEEE International Conference on Acoustics, Speech, and Signal Processing (ICASSP), 5 pp.
Boutremans, Catherine , et al., "Adaptive Joint Playout Buffer and FEC Adjustment for Internet Telephony", LCA—I & C School of Computer and Communication Sciences EPFLIEEE Societies, 11 pp.
Jelinek, Milan , et al., "G.718: A new Embedded Speech and Audio Coding Standard with High Resilience to Error-Prone Transmission Channels", IEEE Communications Magazine, IEEE Service Center, Piscataway, US, vol. 47, No. 10, pp. 117-123.
Lecomte, Jérémie , et al., "Packet-Loss Concealment Technology Advances in EVS", 2015 IEEE International Conference On Acoustics, Speech and Signal Processing (ICASSP), 5 pp.
Neuendorf, Max , et al., "MPEG United Speech and Audio Coding—The ISO/MPEG Standard for High-Efficiency Audio Coding of All Content Types", Audio Engineering Society Convention 132. Audio Engineering Society Apr. 2012; pp. 1-22, pp. 1-22.
Perkins, C. , et al., "RTP Payload for Redundant Audio Data", Internet Engineering Task Force, RFC 2198, 11 pp.
Valin, JM , et al., "Defintion of the Opus Audio Codec", IETF, pp. 1-326.
""ITU-T G.723.1.
""Schnell et al., Proposed Core Experiment on AAC-ELD, Apr. 18, 2007.
""3GPP TS 26.445 V14.0.0, 3rd Generation Partnership Project, Technical Specification Group Services and System Aspects, Codec for Enhanced Voice Services (EVS), Detailed Algorithmic Description, (Release 14), Mar. 2017.
""3GPP TS 26.442 V14.0.0, 3rd Generation Partnership Project, Technical Specification Group Services and System Aspects, Codec for Enhanced Voice Services (EVS), ANSI C code (fixed-point), (Release 14), Mar. 2017.
""3GPP TS 26.443 V14.0.0, 3rd Generation Partnership Project, Technical Specification Group Services and System Aspects, Codec for Enhanced Voice Services (EVS), ANSI C code (floating-point), (Release 14), Mar. 2017.
""3GPP TR 26.952 V17.0.0, 3rd Generation Partnership Project, Technical Specification Group Services and System Aspects, Codec for Enhanced Voice Services (EVS), Performance Characterization, (Release 17), Apr. 2022.
""3GPP TS 26.403 V6.0.0, 3rd Generation Partnership Project, Technical Specification Group Services and System Aspects, General audio codec audio processing functions, Enhanced aacPlus general audio codec, Encoder specification AAC part, (Release 6), Sep. 2004.
""ITU-T G.718, Series G: Transmission Systems and Media, Digital Systems And Networks, Digital terminal equipments—Coding of voice and audio signals, Jun. 2008.
""3GPP TS 26.445 V12.0.0, 3rd Generation Partnership Project, Technical Specification Group Services and System Aspects, Codec for Enhanced Voice Services (EVS), Detailed Algorithmic Description, (Release 12), Sep. 2014.
""3GPP TS 26.445 V14.2.0 (Dec. 2017)—3rd Generation Partnership Project; Technical Specification Group Services and System Aspects; Codec for Enhanced Voice Services (EVS); Detailed Algorithmic Description (Release 14)—675 pages., Dec. 2017.
""3GPP TS 26.445 V16.2.0, 3rd Generation Partnership Project, Technical Specification Group Services and System Aspects, Codec for Enhanced Voice Services (EVS), Detailed Algorithmic Description, (Release 16), Dec. 2021.
""3GPP TS 26.445 V17.0.0, 3rd Generation Partnership Project, Technical Specification Group Services and System Aspects, Codec for Enhanced Voice Services (EVS), Detailed Algorithmic Description, (Release 17), Apr. 2022.
""Convolution theorem—Wikipedia.
""3GPP TS 26.447 V14.0.0, 3rd Generation Partnership Project, Technical Specification Group Services and System Aspects, Codec for Enhanced Voice Services (EVS), Error Concealment of Lost Packets (Release 14), Mar. 2017.
""3GPP TS 26.447 V16.0.0 (Mar. 2019)—3rd Generation Partnership Project; Technical Specification Group Services and System Aspects; Codec for Enhanced Voice Services (EVS); Error Concealment of Lost Packets (Release 16)—82 pages., Mar. 2019.
""3GPP TS 26.290 V10.0.0, 3rd Generation Partnership Project, Technical Specification Group Services and System Aspects, Audio codec processing functions, Extended Adaptive Multi-Rate—Wideband (AMR-WB+) codec, Transcoding functions (Release 10), Mar. 2011.
""3GPP TS 26.447 V14.2.0, 3rd Generation Partnership Project, Technical Specification Group Services and System Aspects, Codec for Enhanced Voice Services (EVS), Error Concealment of Lost Packets, (Release 14), Jun. 2020.
""3GPP TS 26.290 V2.0.0, 3rd Generation Partnership Project; Technical Specification Group Service and System Aspects, Audio codec processing functions; Extended AMR Wideband codec, Transcoding functions (Release 6), Sep. 2004.
""3GPP TS 26.290 version 6.1.0 Release 6), Universal Mobile Telecommunications System (UMTS), Audio codec processing functions, Extended Adaptive Multi-Rate—Wideband (AMR-WB+) codec, Transcoding functions, Dec. 2004.
"Annex A: Comfort noise aspects", ITU-T G.722.2, of the Telecommunication Standardization Sector of the International Telecommunication Union ("G.722.2"), Jan. 2002, 16 pp.
"Qualification Deliverables for the Fraunhofer IIS Candidate for EVS (including Technical Description and Report on Compliance to Design Constraints)", Fraunhofer IIS: Tdoc S4-130345, TSG SA4# 72bis meeting, Mar. 11-15, 2013, San Diego, Mar. 11, 2013, 8 pp.
"Wideband Coding of Speech at around 16 kbit/s using Adaptive Multi-Rate Wideband (AMR-WB)", ITU-T G.722, Series G: Transmission Systems and Media, Digital Systems And Networks, Digital terminal equipments—Coding of analogue signals by methods other than PCM, Jul. 2003, 72 pp.
Bosi, Marina, "Introduction to Digital Audio Coding and Standards", Springer 2003, 2003, 442 pp.
Clark, G., "A unified approach to time- and frequency-domain realization of FIR adaptive digital filters", In IEEE Transactions on Acoustics, Speech, and Signal Processing, vol. 31, No. 5, pp. 1073-1083, Oct. 1983.
Fuchs, Guillaume, "MDCT-Based Coder For Highly Adaptive Speech And Audio Coding", 17th European Signal Processing Conference (EUSIPCO 2009), Glasgow, Scotland, Aug. 24-28, 2009, Aug. 24, 2009, 5 pp.
Hou, Huan, "Real-time Audio Error Concealment Method Based on Sinusoidal Model,", International Conference on audio Language and Image Processing, IEEE, Jul. 2008, Shanghai, P.R. China, DOI: 10.1109/ICALIP.2008.4590009, Aug. 2008, 8 pp.
Kondoz, "Digital Speech: Coding for Low bit Rate Communication Systems", (John Wiley & Sons 2004).
Lecomte, "An Improved Low Complexity AMR-WB+ Encoder using Neural Networks for Mode Selection", AES 123rd Convention, New York, NY, USA, Oct. 5-8, 2007 m Convention Paper 7294 section 2.1.2.
Malvar, Henrique S., "Signal Processing with Lapped Transforms", Computer Science Engineering, 1992 , Chapter 5.
Oh, H, "A Fast Quantization Loop Algorithm for MP3/AAC Encoders", AES 29th International Conference (2006).
Ostergaar, Jan, "Real-Time Perceptual Moving-Horizon Multiple-Description Audio Coding", IEEE Transactions On Signal Processing, 4286 (2011), 2011, 14 pp.
Ravishankar, Channasandra, "Speech Coding", Hughes Network Systems, Germantown, MD. United States, https://doi.org/10.2172/325392, May 8, 1998, 144 pp.

(56) References Cited

OTHER PUBLICATIONS

Schnell, Markus, "Low Delay Filterbanks For Enhanced Low Delay Audio Coding", 2007 IEEE Workshop on Applications of Signal Processing to Audio and Acoustics Oct. 21, 2007, Oct. 21, 2007, 4 pp.

Virette, David, "Low Delay Transform for High Quality Low Delay Audio Coding", Signal and Image Processing, (Université de Rennes 1, 2012), 40-41, Jan. 2012, 197 pp.

Warren, J.D., "Analysis of the spectral envelope of sounds by the human brain", Neuroimage. Feb. 15, 2005;24(4):1052-7, https://pubmed.ncbi.nlm.nih.gov/15670682/#:~: text=Spectral%20envelope%20is%20the%20shape,of%20sounds%20such%20as%20vowels.

* cited by examiner

ENCODER, DECODER AND METHOD FOR ENCODING AND DECODING AUDIO CONTENT USING PARAMETERS FOR ENHANCING A CONCEALMENT

CROSS-REFERENCE TO RELATED APPLICATIONS

This application is a continuation of copending U.S. patent application Ser. No. 17/127,140, filed Dec. 18, 2020, which in turn is a continuation of copending U.S. patent application Ser. No. 15/442,980, filed Feb. 27, 2017, which in turn is a continuation of copending International Application No. PCT/EP2015/069348, filed Aug. 24, 2015, which is incorporated herein by reference in its entirety, and additionally claims priority from European Application No. 14182553.9, filed Aug. 27, 2014, and from European Application No. 15164126.3, filed Apr. 17, 2015, which are also incorporated herein by reference in their entirety.

BACKGROUND OF THE INVENTION

The present invention concerns an audio codec, using an encoder and a decoder, in which audio frames that are defective, e.g. lost, corrupted or delayed, are at least partially reconstructed by using an error concealment mechanism. The present invention improves conventional error concealment mechanisms by providing selected error concealment helper parameters within the bitstream, which error concealment helper parameters enhance the decoder-sided concealment.

In VoIP systems, packets arrive with different latencies or even in swapped chronological order at the receiver. As each packet is expected at a determined, periodic point of time for decoding at the speech/audio decoder, a so-called de-jitter buffer is needed to remove the time jitter and restore correct order between the packets, if possible.

The availability of a de-jitter buffer enables the usage of channel aware coding, where a partial redundant copy of a current frame is coded on top of a future frame's primary copy within the encoder. If the current frame gets lost or arrives too late at the receiver, its partial redundant copy, which arrives within a later frame, can be used to synthesize the lost frame. The delay (or number of frames) between a primary frame and its partial redundant copy, the so-called FEC offset, as well as the decision, if a partial redundant copy of a particular frame needs to be transmitted at all, can be controlled dynamically at the encoder, depending on the actual available system delay and the frame error rate (FER), i.e. the current channel conditions.

Although this technique necessitates the total size of the primary frame to be reduced to keep the bitrate constant, it allows for better quality compared to non-channel aware/redundancy based approaches at mid and high FERs.

Networks such as the internet are used for VoIP communication such as conferencing, in addition to sending data. Accordingly, multiple voices or music is encoded into digital data, the data is arranged in packets, and the packets are transmitted to the recipient over a network. VoIP necessitates that this process happen in real time.

A disadvantage of protocols that permit real time use is that they are unreliable, in that they permit packets to be lost, without retrieving them. When that happens, the voice or audio segments they were carrying are not reconstructed, and the recipient hears annoying gaps in speech or music. These gaps are perceived as reduced quality of service.

In order to conceal the fact that a packet has been lost, redundancy schemes have been devised. Redundant packets are encoded and transmitted, which repeat aspects of the original data. If a packet is lost, its data is recovered and/or reconstructed from its corresponding redundant packet, which is hopefully not lost. A jitter buffer at the receiving end collects the primary and redundant packets and feeds them to the decoder which plays them out.

The first media-specific error correction scheme defined for RTP was audio redundancy coding, specified in RFC 2198 [1]. This was designed for voice teleconferences. Each packet contains both an original frame of audio data and a redundant copy of a preceding frame, in a more heavily compressed format.

Packet-based traffic can be subject to high packet loss ratios, jitter and reordering. Forward error correction (FEC) is one technique for addressing the problem of lost packets. Generally, FEC involves transmitting redundant information along with the coded speech. The decoder attempts to use the redundant information to reconstruct lost packets. Media-independent FEC techniques add redundant information based on the bits within the audio stream (independent of higher-level knowledge of the characteristics of the speech stream). On the other hand, media-dependent FEC techniques add redundant information based on the characteristics of the speech stream.

The granted patent U.S. Pat. No. 6,757,654 [2] describes an improved FEC technique for coding speech data. U.S. Pat. No. 6,757,654 discloses:

"[This technique consist of] an encoder module primary-encodes an input speech signal using a primary synthesis model to produce primary-encoded data, and redundant-encodes the input speech signal using a redundant synthesis model to produce redundant-encoded data. A packetizer combines the primary-encoded data and the redundant-encoded data into a series of packets and transmits the packets over a packet-based network, such as an Internet Protocol (IP) network. A decoding module primary-decodes the packets using the primary synthesis model, and redundant-decodes the packets using the redundant synthesis model. The technique provides interaction between the primary synthesis model and the redundant synthesis model during and after decoding to improve the quality of the synthesized output speech signal. Such "interaction," for instance, may take the form of updating states in one model using the other model.

Further, the present technique takes advantage of the FEC-staggered coupling of primary and redundant frames (i.e., the coupling of primary data for frame n with redundant data for frame n−1) to provide look-ahead processing at the encoder module and the decoder module. The look-ahead processing supplements the available information regarding the speech signal, and thus improves the quality of the output synthesized speech.

The interactive cooperation of both models to code speech signals greatly expands the use of redundant coding heretofore contemplated by conventional systems."

The conference paper [3] presents a joint playout buffer and Forward Error Correction (FEC) adjustment scheme for Internet Telephony, which incorporates the impact of end-to-end delay on the perceived audio quality. Conference paper [3] represents the perceived audio quality as a function of both the end-to-end delay and the distortion of the voice signal. A joint rate/error/playout delay control algorithm is developed that optimizes this measure of quality.

As said in [3], Media specific FEC is used by most audio conferencing tools. The principle of the signal processing FEC is to transmit each segment of audio, encoded with different quality coders, in multiple packets. When a packet is lost, another packet containing the same segment (maybe encoded differently) can be able to cover the loss.

All the state of the art is based on redundancy, which means sending a really low bitrate version of the current frame with a later frame. Although redundant audio encoding can provide exact repair (if the redundant copy is identical to the primary) it is more likely that a lower bitrate will be used and hence lower quality will be achieved. In the context of advance Speech and audio coding the data rate is getting big for each frame and transmitting a really low bitrate version of it leads to relatively poor quality.

Thus, it is desired to improve existing error concealment mechanisms.

SUMMARY

An embodiment may have an encoder for coding speech-like content and/or general audio content, wherein the encoder is configured to embed, at least in some frames, parameters in a bitstream, which parameters enhance a concealment in case an original frame is lost, corrupted or delayed.

Another embodiment may have a decoder for decoding speech-like content and/or general audio content, wherein the decoder is configured to use parameters which are sent later in time to enhance a concealment in case an original frame is lost, corrupted or delayed.

Another embodiment may have a system comprising an encoder according to the invention and a decoder according to the invention.

Another embodiment may have a method for encoding speech-like content and/or general audio content, the method comprising: embedding, at least in some frames, parameters in a bitstream, which parameters enhance a concealment in case an original frame is lost, corrupted or delayed.

Another embodiment may have a method for decoding speech-like content and/or general audio content, the method comprising: using parameters which are sent later in time to enhance a concealment in case an original frame is lost, corrupted or delayed.

Another embodiment may have a non-transitory digital storage medium having a computer program stored thereon to perform the method for encoding speech-like content and/or general audio content, the method comprising: embedding, at least in some frames, parameters in a bitstream, which parameters enhance a concealment in case an original frame is lost, corrupted or delayed, when said computer program is run by a computer.

Another embodiment may have a non-transitory digital storage medium having a computer program stored thereon to perform the method for decoding speech-like content and/or general audio content, the method comprising: using parameters which are sent later in time to enhance a concealment in case an original frame is lost, corrupted or delayed, when said computer program is run by a computer Another embodiment may have an encoder for coding audio content, wherein the encoder is configured to provide a primary encoded representation of a current frame and an encoded representation of at least one error concealment parameter for enhancing a decoder-sided error concealment of the current frame, wherein the encoder is configured to select the at least one concealment parameter based on one or more parameters representing a signal characteristic of the audio content contained in the current frame.

Another embodiment may have a decoder for decoding audio content, wherein the decoder is configured to receive a primary encoded representation of a current frame and/or an encoded representation of at least one error concealment parameter for enhancing a decoder-sided error concealment of the current frame, wherein the decoder is configured to use the error concealment for at least partly reconstructing the audio content of the current frame by using the at least one error concealment parameter in the case that the primary encoded representation of the current frame is lost, corrupted or delayed.

Another embodiment may have an apparatus for error concealment, the apparatus being configured for performing a standard concealment mechanism for a lost frame and to use transmittable parameters to enhance the concealment.

Another embodiment may have an apparatus for error concealment, the apparatus being configured for not comprising a partial copy that is just a low bitrate version of the primary, but for comprising a partial copy comprising multiple key parameters for enhancing the concealment.

Another embodiment may have an apparatus for error concealment with a receiver comprising a de-jitter buffer for providing a partial redundant copy of a current lost frame if it is available in any of the future frames, wherein the apparatus is configured for reading a partial redundant information bitstream and for updating corresponding parameters.

Another embodiment may have a switched Coder or decoder, in which there are two or more core coding schemes, whereas for example one uses ACELP for coding speech-like content and the second use TCX for coding general audio content wherein ACELP frames are processed using a partial redundant copy coding and TCX frames are processed using a different approach, wherein in frames that are close to a core coder switch, two special cases can occur, namely: ACELP primary frame with partial copy generated from future TCX frame on top, TCX primary frame with partial copy generated from future ACELP frame on top wherein, for these cases, both core coders are configurable to create primary frames in combination with partial copies from the other coder type, without infringing the required total size of a frame, to assure a constant bitrate, or wherein: a first TCX frame after an ACELP frame, where, if this frame gets lost and thus is not available to the decoder, the proposed technique will TCX conceal the frame using partial copy information that has been transported in top of another frame, wherein concealment needs a preceding frame for extrapolating the signal content, ACELP concealment is used (as the previous frame was ACELP) and wherein it is decided already in the encoder, to not put a partial copy on top of a TCX frame after a switch, or where there is a signal-adaptive partial copy selection, where a signal is analyzed before encoding to determine if the usage of partial copy is favorable, wherein if the signal could be concealed satisfyingly well without the help of additional partial copy info within the decoder, but the clean channel performance suffers because of reduced primary frame, a partial copy usage is turned off or a specifically reduced partial copy is used within the encoder.

Another embodiment may have a Transform Domain Coder or decoder, wherein an en-/decoding scheme is used, where at least in some frames redundant coding parameters are embedded in the bitstream and transmitted to the decoder side or wherein a redundant info is delayed by some time and embedded in a packet which is encoded and sent later in time such that the info can be used in the case of the decoder already having the future frame available, and the original frame is lost, corrupted or delayed even more.

Another embodiment may have a transform domain coder or decoder as before, wherein redundant information comprises ISF/LSF parameters: ISF/LSF parameter representation is used for quantization and coding of LPC parameters. In TCX the LPC is used to represent the masking threshold. This is an essential parameter and very helpful to have available correctly on decoder side in case of a frame loss. Especially if the ISF/LSFs are coded predictively the concealment quality will improve significantly by having this info available during concealment, because the predictor states on decoder side will stay correct (in sync to encoder) and this will lead to a very quick recovery after the loss; Signal classification: Signal classification is used for signaling the content types: UNVOICED, UNVOICED TRANSITION, VOICED TRANSITION, VOICED and ONSET. Typically this type of classification is used in speech coding and indicating if tonal/predictive components are present in the signal or if the tonal/predictive components are changing. Having this information available on the decoder side during concealment may help to determine the predictability of the signal and thus it can help adjusting the amplitude fade-out speed, the interpolation speed of the LPC parameters; TCX global gain/level: The global gain may be transmitted to easily set the energy of the concealed frame to the correct (encoder determined level) in case it is available; Window information like overlap length; or Spectral peak positions to help tonal concealment.

Another embodiment may have a method or computer program similar to an apparatus according to the invention.

According to an aspect, it is proposed to provide an encoder for coding speech-like content and/or general audio content, wherein the encoder is configured to embed, at least in some frames, parameters in a bitstream, which parameters enhance a concealment in case an original frame is lost, corrupted or delayed. Even though standard concealment mechanisms may be used for a lost frame, the parameters that are embedded in the frames will be used to enhance this concealment. Accordingly, this invention proposes to not have a partial copy that is just a low bitrate version of the primary, but to transmit some selected parameters only that will enhance a concealment. Therefore the decoder may work different from decoders as proposed in the state of the art.

It has been found that the provision of some selected parameters which enhance the error concealment (e.g. which define characteristics of a lost frame which would otherwise need to be estimated on the basis of a previous frame preceding a defective frame that has been lost, corrupted or delayed) brings along a good error concealment (of a defective frame) while keeping a necessitated bitrate low.

Worded differently, the transmission of the parameters which enhance the concealment makes it possible to reconstruct a defective frame on the basis of information about previously decoded frames, wherein most of the information of the concealed frame is derived from one or more frames preceding (or following) the defective frame, but wherein one or more of the most relevant characteristics of the defective frame (or one or more of the most important parameters of the error concealment), which would normally need to be derived from the preceding or following correctly coded frames, are represented in a comparably accurate manner by the parameters which enhance the concealment.

Worded yet differently, the embedded parameters for enhancing the error concealment may be insufficient for a reconstruction of a defective frame in that they do not contain all necessitated types of information but support an error concealment in that the most important types of information are provided by the parameters while other types of information for the concealment are derived from previously decoded frames at the decoder side.

Accordingly, a good compromise between error concealment quality and bitrate is achieved.

In an embodiment, the encoder may be configured to create a primary frame and a so-called "partial copy", wherein the "partial copy" is not a low bitrate version of the primary frame but wherein the "partial copy" contains the parameters (e.g. some of the most relevant parameters necessitated for concealing if the frame under consideration is defective). In other words, the "partial copy" as used herein is not a low bitrate representation of the (original) audio content being embedded as redundant information to the bitstream, and which may later be used to fully synthesize the output signal. Instead, it is the inventive concept to embed some parameter data, namely the aforementioned parameters which enhance the concealment at the decoder side, if said parameter data is available. When using this information, the decoder has to be in a concealment mode. Accordingly, the decoder will decode the "partial copy" of a defective, i.e. lost, corrupted or delayed frame (possibly available due to a de-jitter buffer delay) and use said decoded parameters to assist the concealment routine at the decoder side. Thus, the size that may be needed to encode a partial copy, comprising only one or more parameters, can be reduced when compared to the size needed to encode a redundant copy by redundant-encoding the content of an entire primary frame (e.g. at a reduced bitrate), whereas would generally also be possible to use the same bitrate or a higher bitrate for encoding a partial copy. However, the inventive concept, i.e. enhancing a concealment by error concealment helper parameters, provides for a better quality compared to conventional decoding of a low bitrate version of the respective primary frame.

In an embodiment, the encoder may be configured to delay the parameters by some time and to embed the parameters in a packet which is encoded and sent later in time. In other words, the encoder first sends the primary frame in a first packet. With a certain time delay, the encoder then sends the "partial copy" in another packet which is sent later than the first packet. Accordingly, the encoder still quantizes the parameters but adds them to the bitstream in a later packet. Thus, even when a primary frame is unavailable or defective, e.g. lost, corrupted or delayed, its content may still be correctly reconstructed (or at least approximated without severe artefacts) at the decoder side by means of a concealment with the help of the parameters that have been sent later and which might therefore be available at the decoder.

In an embodiment, the encoder may be configured to reduce a primary frame bitrate, wherein the primary frame bitrate reduction and a partial copy frame coding mechanism together determine a bitrate allocation between the primary frames and partial copy frames to be included within a constant total bitrate. Thus, the encoder provides for a constant total bitrate when sending primary frames and partial copy frames, while at the same time providing good audio quality with low perceptual impact.

In an embodiment, the encoder may be configured to create a primary frame of one of the speech-like content type and the general audio content type in combination with a partial copy of the other one of the speech-like content type and the general audio content type. Thus, the encoder is versatile as it can handle different types of audio content separately or in combination with each other. This is particularly useful as the encoder is thus adapted to combine, for example, an ACELP primary frame with a TCX partial redundant copy, or vice versa.

In an embodiment, the encoder may be part of a codec using a TCX coding scheme. According to this embodiment, the encoder advantageously uses TCX coding for efficiently encoding general audio content, music, background noise, or the like. The encoder can reliably determine and transmit TCX specific parameters that can be used for TCX concealment at the decoder side when the partially redundant frame may, for example, not include any encoded spectral values and may therefore by itself not be sufficient to reconstruct the defective frame.

In an embodiment, the encoder may be configured to detect whether the frame contains a noisy, or Noise-like, audio signal or whether the frame contains a noise floor with sharp spectral lines that are stationary over a period of time, and to embed, based on the detection, the parameters into a TCX frame. Thus, a decision on the current signal characteristic can already be made at the encoder side such that specific parameters for those signals are encoded and sent to the decoder for enhancing the concealment.

In an embodiment, the parameters may comprise ISF or LSF parameters, in particular predictively coded ISF or LSF parameters. ISF and LSF parameter representation is used for quantization and coding of LPC parameters. In a TCX coding scheme the LPC is used to represent the masking threshold. This is an important parameter and very helpful to have available correctly on decoder side in case of a frame loss. Especially if the ISF/LSFs are coded predictively the concealment quality will improve by having this info available during concealment, because the predictor states on decoder side will stay correct, i.e. in sync to the encoder, and this will lead to a quick recovery of an unavailable primary frame.

In an embodiment, the parameters may comprise signal classification parameters. Signal classification is used for signaling the content types: UNVOICED, UNVOICED TRANSITION, VOICED TRANSITION, VOICED and ONSET. Typically this type of classification is used in speech coding and indicating if tonal/predictive components are present in the signal or if the tonal/predictive components are changing. Having this information available on the decoder side during concealment may help to determine the predictability of the signal and thus it can help adjusting the amplitude fade-out speed, the interpolation speed of the LPC parameters.

In an embodiment, the parameters may comprise a TCX global gain or a TCX global level. The global gain may be transmitted to easily set the energy of the concealed frame to the correct (encoder determined level) in case it is available.

In an embodiment, the parameters may comprise at least one of a window information and a spectral peak position. Having this information available already at the encoder side is useful for selectively transmitting those parameters to the decoder for concealment.

In an embodiment, the encoder may be part of a switched codec, wherein the switched codec consists of at least two core coding schemes, wherein a first core coding scheme uses ACELP and a second core coding scheme uses TCX. For example, the encoder uses ACELP for coding speech-like audio content and TCX for coding general audio content. Thus, using several coding schemes for encoding audio content renders the encoder versatile. Furthermore, the encoder provides good results by using a signal specific coding scheme for each signal.

In an embodiment, the encoder may be configured to not put a "partial copy" on top of a TCX frame after a switch when there is a first TCX frame after an ACELP frame. For example, the provision of parameters enhancing a concealment may be selectively omitted in this case. If the first TCX frame is lost, it is not possible to conceal in TCX mode. Thus, ACELP concealment will be used instead. In this case, TCX partial copies alone will not be sufficient to fully synthesize the frame, the decoder needs to be in concealment mode and may be supported by partial copies. Thus, as concealment needs a preceding frame for extrapolating the signal content, it is of advantage in this case to use ACELP concealment (as the previous frame was ACELP) which would make a TCX partial copy less useful. As the encoder is configured to detect a switch and to selectively, i.e. depending on a switch event, provide a certain type of partial copy, the concealment at the decoder side will provide a good result.

In an embodiment, the encoder may be configured to analyze the signal before encoding and to turn off the partial copy usage (e.g. not provide any parameters) or to provide a reduced partial copy (e.g. provide less parameters than in a normal case) based on the analyzed signal. For example, if a signal could be concealed satisfyingly well without the help of additional partial copy info within the decoder, but the clean channel performance suffers because of reduced primary frame, partial copy usage can be turned off or a specifically reduced partial copy can be used within the encoder. Thus, the encoder is adapted to selectively provide a partial copy, i.e. to provide a partial copy only if concealment parameters are needed at the decoder side for reconstructing audio content of an unavailable primary frame. Furthermore, the bandwidth-usage of the primary frame transmission can be optimized.

In an embodiment, the encoder may be configured to choose between multiple partial copy modes which use different amounts of information and/or different parameter sets, wherein the selection of the partial copy mode is based on parameters (e.g. parameters describing the signal to be encoded). Thus, the encoder can selectively choose a certain partial copy mode for providing a partial copy that is well suited for concealing a certain unavailable primary frame at the decoder side. The selection between multiple partial copy modes is based on various parameters, such as the current and/or previous frame's signal characteristics, including pitch stability, LTP pitch, LTP gain, the temporal trend of the signal, the mode of the last two frames and a frame class.

In an embodiment, at least one of the multiple partial copy modes may be a frequency domain concealment mode. This mode can selectively be chosen by the encoder for providing a partial copy comprising certain parameters that are well suited for providing, at the decoder side, a good concealment result of an unavailable primary frame containing a frequency domain signal.

In an embodiment, at least two of the multiple partial copy modes may be different time domain concealment modes. For example, a first partial copy mode could be selected if the respective time domain signal comprises at least a certain characteristic. Otherwise, if the time domain signal does not comprise this certain characteristic, or if the time domain signal comprises a different signal characteristic, the second partial copy mode is chosen. Thus, the encoder provides for a signal specific selection of the parameters contained in a partial copy.

In an embodiment, one of the at least two time domain concealment modes can be selected if a frame contains a transient or if a global gain of the frame is lower (e.g. at least by a predefined amount) than a global gain of a previous frame. Thus, the encoder selectively chooses a mode for providing parameters which are used, at the decoder side, for enhancing a concealment of a defective or unavailable primary frame, even if this defective or unavailable primary frame's signal characteristics deviate to a certain extent from the previous frame's signal characteristic.

In an embodiment, the encoder may be configured to send (as a parameter for enhancing a concealment) a LTP lag if LTP data is present. Thus, the encoder selectively provides parameters used, at the decoder side, for Long Term Prediction decoding.

In an embodiment, the encoder may be configured to send (as a parameter for enhancing a concealment) a classifier information. Signal classification is used for signaling the content types: UNVOICED, UNVOICED TRANSITION, VOICED TRANSITION, VOICED and ONSET. Typically, this type of classification is used in speech coding and indicating if tonal/predictive components are present in the signal or if the tonal/predictive components are changing. Having this information available on the decoder side (sent by the encoder) during concealment may help to determine the predictability of the signal and thus it can help adjusting the amplitude fade-out speed and/or the interpolation speed of LPC parameters and it can control possible usage of high- or low pass filtering of voiced or unvoiced excitation signals (e.g. for de-noising).

In an embodiment, the encoder may be configured to send (as a parameter for enhancing a concealment) at least one of LPC parameters, LTP Gain, Noise Level and Pulse Position. Thus, the encoder transmits certain parameters that are well suited for concealing, at the decoder side, the content of a defective or unavailable primary frame (i.e. to enhance the concealment).

Another embodiment provides a decoder for decoding speech-like content and/or general audio content, wherein the decoder is configured to use parameters which are sent later in time to enhance a concealment in case an original frame is lost, corrupted or delayed. Accordingly, at the receiver (or decoder), the parameters which are sent later in time can be used for enhancing an error concealment at the decoder side and thus recreating a signal (e.g. a concealed signal which avoids severe artefacts) if the original frame is defective, e.g. lost, corrupted or delayed. Thus, the inventive concept can reliably reconstruct unavailable audio content by using parameters enhancing a concealment while efficiently using a given bandwidth.

For example, the parameters which are sent to enhance the concealment (and which are evaluated) by the audio decoder may comprise one or more of the most important information types which are necessitated in a concealment of a defective frame by a concealment unit of the decoder. However, the parameters are typically chosen such that the parameters alone are insufficient to perform a full error concealment. Rather, for actually performing the error concealment, the concealment unit of the decoder typically obtains additional information types, for example, on the basis of previously (or subsequently) decoded frames. Thus, the parameters which are sent later in time merely enhance the concealment, but they do not constitute a full concealment information.

Accordingly, the usage of the parameters which are sent later in time allows to have a precise information about the most important concealment parameters available at the audio decoder with only small bitrate effort, while additional information necessitated for providing a concealed frame is generated by the audio decoder itself, for example on the basis of one or more previously (or subsequently) decoded frames using extrapolation or interpolation.

In an embodiment, the decoder may be configured to receive a primary frame and a "partial copy", wherein the "partial copy" is not a low bitrate version of the primary frame but wherein the "partial copy" contains the parameters to enhance a concealment. As the "partial copy" contains these parameters, the bandwidth used for the transmission of these parameters is even lower as compared to the bandwidth used for transmitting a low bitrate version of the primary frame.

In an embodiment, the parameters are contained in a partial copy and the decoder is configured to receive from a de-jitter buffer the partial copy of a currently lost frame if it is available. A de-jitter buffer further improves the inventive concept as it is able to provide a jitter delay, wherein a certain number of frames can be buffered. Thus, frames that arrive at the decoder in a wrong chronological order (i.e. a first frame that has been sent at the encoder side prior to a second frame arrives later at the decoder side than the second frame, even though the first frame is expected to arrive earlier at the decoder side than the second frame) can be buffered and provided in the correct chronological order. This is particularly useful if a frame is delayed.

In an embodiment, the decoder may be configured to receive a primary frame of one of the speech-like content type and the general audio content type in combination with a partial copy of the other one of the speech-like content type and the general audio content type. Thus, the decoder is versatile as it can handle different types of audio content separately or in combination with each other. This is particularly useful as the decoder is thus adapted to extract, for example, a TCX partial redundant copy that has been transported on top of an ACELP primary frame, or vice versa.

In an embodiment, the decoder may be part of a codec using a TCX codec scheme. According to this embodiment, the decoder advantageously uses TCX decoding for efficiently decoding general audio content, music, background noise, or the like. The decoder can reliably extract TCX specific parameters (to enhance a concealment) from a partial copy for enhancing a TCX concealment.

In an embodiment, the parameters may comprise ISF or LSF parameters, in particular predictively coded ISF or LSF parameters. ISF and LSF parameter representation is used for quantization and coding of LPC parameters. In a TCX coding scheme the LPC is used to represent the masking threshold. This is an important parameter and very helpful to have available correctly on decoder side in case of a frame loss. Especially if the ISF/LSFs are coded predictively the concealment quality will improve by having this info available during concealment, because the predictor states on decoder side will stay correct, i.e. in sync to the encoder, and this will lead to a quick recovery of an unavailable primary frame.

In an embodiment, the parameters may comprise signal classification parameters. Signal classification is used for signaling the content types: UNVOICED, UNVOICED TRANSITION, VOICED TRANSITION, VOICED and ONSET. Typically this type of classification is used in speech coding and indicating if tonal/predictive components are present in the signal or if the tonal/predictive components are changing. Having this information available on the decoder side during concealment may help to determine the predictability of the signal and thus it can help adjusting the amplitude fade-out speed, the interpolation speed of the LPC parameters.

In an embodiment, the parameters may comprise a TCX global gain or a TCX global level. The global gain may be transmitted to easily set the energy of the concealed frame to the correct (encoder determined) level in case it is available.

In an embodiment, the parameters may comprise at least one of a window information and a spectral peak position. Having this information available at the decoder side is useful for selectively enhancing the concealment.

In an embodiment, the decoder may be part of a switched codec, wherein the switched codec consists of at least two core coding schemes, wherein a first core coding scheme uses ACELP and a second core coding scheme uses TCX. For example, the decoder uses an ACELP decoding scheme for decoding speech-like audio content and a TCX decoding scheme for decoding general audio content. Thus, using several decoding schemes for decoding different audio content renders the decoder versatile.

In an embodiment, the decoder may be configured to use, after a switch, ACELP concealment in the case that a first TCX frame after an ACELP frame is not available to the decoder. If the first TCX frame is defective, i.e. lost, corrupted or delayed, it is not possible to conceal in TCX mode. Thus, ACELP concealment will be used instead. In this case, TCX partial copies alone will not be sufficient to fully synthesize the frame, the decoder needs to be in concealment mode and may be supported by partial copies. As concealment needs a preceding frame for extrapolating the signal content, it is of advantage in this case to use ACELP concealment (as the previous frame was ACELP) which would make a TCX partial copy less useful.

In an embodiment, the decoder may be configured to choose between multiple partial copy modes or concealment modes which use different amounts of information and/or different parameter sets among a plurality of several modes available at the decoder. In an embodiment, the decoder chooses the concealment mode if the decoder does not get the respective mode, i.e. if it cannot determine or otherwise retrieve it, from the partial copy. Otherwise, the concealment mode is dictated by the available partial copy, wherein it is the encoder that makes the decision then. Accordingly, the decoder uses the respectively coded different amounts of information and/or different parameter sets directly from the bitstream sent at the encoder side. Thus, the decoder can apply a well-suited concealment mode based on the partial copy mode, wherein there is more supporting (enhancement) information (i.e. parameters) in one mode and less in another mode. In other words, in CA-mode, the encoder decides on the appropriate concealment mode and prepares the partial copy accordingly. If a partial copy is available to the decoder and it should be used for enhancing the concealment, the decoder sticks to the decision made by the encoder, otherwise the info within the partial copy cannot be exploited properly. The decoder only decides itself on the concealment mode, if no partial copy is available or if the partial copy is not and/or should not be used for other reasons.

In an embodiment, at least one of the multiple partial copy modes may be a frequency domain concealment mode. This mode can selectively be chosen by the decoder for using a partial copy comprising certain parameters that are well suited for providing a good concealment result of an unavailable primary frame containing a frequency domain signal.

In an embodiment, at least two of the multiple partial copy modes may be different time domain concealment modes. For example, a first partial copy contains parameters of a respective time domain signal comprising at least a certain characteristic, while a second partial copy contains parameters of a respective time domain signal comprising a different signal characteristic. One of these two time domain modes can selectively be chosen by the decoder for using a partial copy comprising certain parameters that are well suited for providing a good concealment result of an unavailable primary frame containing a time domain signal.

In an embodiment, the decoder may be configured to receive a LTP lag if LTP data is present in the corresponding primary frame. Thus, the decoder is enabled to reconstruct the content of an unavailable primary frame by Long Term Prediction decoding thereby using the LTP parameters that have been received in a partial copy.

In an embodiment, the decoder may be configured to receive a classifier information. Signal classification is used for signaling the content types: UNVOICED, UNVOICED TRANSITION, VOICED TRANSITION, VOICED and ONSET. Typically, this type of classification is used in speech coding and indicating if tonal/predictive components are present in the signal or if the tonal/predictive components are changing. Having this information available on the decoder side (sent by the encoder) during concealment may help to determine the predictability of the signal and thus it can help adjusting the amplitude fade-out speed, the interpolation speed of LPC parameters and it can control possible usage of high- or low pass filtering of voiced or unvoiced excitation signals (e.g. for de-noising).

In an embodiment, the decoder may be configured to receive (as the parameters for enhancing a concealment) at least one of LPC parameters, LTP Gain, Noise Level and Pulse Position. Thus, the decoder is enabled to reconstruct the content of an unavailable primary frame by using at least one of these parameters that have been received in a partial copy.

In an embodiment, the decoder may be configured to decrease a pitch gain and a code gain with two different factors in dependence on a concealment mode. This serves to avoid having a long stationary signal whenever the original signal was more transient like.

In an embodiment, a first factor to decrease a pitch gain and a code gain is 0.4 and a second factor is 0.7. These two factors are particularly efficient in order to avoid having a long stationary signal whenever the original signal was more transient like.

In an embodiment, the decoder may be configured to not take into account a pitch decoded from the partial copy if the previous primary frame is lost, and wherein the decoder is configured to fix, i.e. to adjust, the pitch to a predicted pitch for the following lost primary frame instead of using the pitch transmitted. Accordingly, the pitch decoded from the partial copy shall not be taken into account if the previous frame is lost, because the pitch sent in the bitstream was computed on the encoder side based on the ground truth, but if the previous frame is lost, the synthesis of the previously lost and concealed synthesis might be really different to the encoder ground truth. So it is better in general to not risk relying on the synchronicity of en-/decoder in case of multiple frame loss and fix the pitch to the predicted pitch for the following lost frame instead of using the pitch transmitted.

Another embodiment creates a method for encoding speech-like content and/or general audio content, the method comprising the step of embedding, at least in some frames, parameters in a bitstream, which parameters enhance a concealment in case an original frame is lost, corrupted or delayed. Even though standard concealment mechanisms may be used for a defective, i.e. lost, corrupted or delayed frame, the parameters that are embedded in the frames are used by the inventive method in order to enhance this concealment (and the bitstream parameters may replace parameters which are conventionally derived at the decoder side). Accordingly, this invention proposes to not have a partial copy that is just a low bitrate version of the primary, but to transmit parameters that will enhance a concealment (but which typically do not constitute a full error concealment information). Therefore the decoder may be somewhat modified when compared to the state of the art.

Another embodiment creates a method for decoding speech-like content and/or general audio content, the method comprising the step of using parameters which are sent later in time to enhance a concealment in case an original frame is lost, corrupted or delayed. Accordingly, at the receiver, the parameters which are sent later in time can be used for enhancing an error concealment at the decoder side and thus recreating a signal if the original frame is defective, i.e. lost, corrupted or delayed. Thus, by using the inventive method, defective, corrupted or unavailable audio content can reliably be reconstructed (at least partially) by using parameters instead of an entire redundant coded frame.

Another embodiment creates an encoder for coding audio content, wherein the encoder is configured to provide a primary encoded representation of a current frame and an encoded representation of at least one error concealment parameter for enhancing a decoder-sided error concealment of the current frame, wherein the encoder is configured to select the at least one concealment parameter based on (or in dependence on) one or more parameters representing a signal characteristic of the audio content contained in the current frame. For example and therefore not limiting, the parameters representing a signal characteristic may be chosen from at least the current and previous frame's signal characteristics, including pitch stability, LTP pitch, LTP gain, the temporal trend of the signal, the mode of the last two frames and a frame class. Based on these signal characteristic parameters, the encoder selectively chooses one or more concealment parameters which are well suited for an error concealment at the decoder side. These error concealment parameters are separately encoded, i.e. separately from the primary encoded representation of the signal to be transmitted. Thus, the decoder can reconstruct the signal from these error concealment parameters by using an error concealment, even if the primary encoded representation of that signal is lost, corrupted or delayed. Accordingly, at least in some frames (or packets) error concealment parameters (also designated as redundant coding parameters) are embedded in the bitstream and transmitted to the decoder side. Thus, it is not necessary to provide a "partial copy" of the entire signal, which is usually encoded at a lower bitrate and may therefore comprise a lower quality. Thus, the present invention provides for an improved concept to conceal defective, e.g. lost, corrupted or delayed frames by means of selected error concealment parameters that are already selected (for example in accordance with signal characteristics) at the encoder side and embedded in the bitstream. Thus, the invention keeps within a given bandwidth while at the same time preserving a good quality of the transmitted signal even if a portion (e.g. a frame) of this signal is reconstructed by concealment at the decoder side.

In an embodiment, the decoder-sided error concealment is an extrapolation-based error concealment. Accordingly, the concealment routine may use extrapolation in order to estimate or predict the future signal characteristics, which may further help and assist the concealment of defective primary frames.

In an embodiment, the encoder may be configured to combine the encoded representation of the at least one error concealment parameter of the current frame with a primary encoded representation of a future frame into a transport packet such that the encoded representation of the at least one error concealment parameter of the current frame is sent with a time delay relative to the primary encoded representation of the current frame. In other words, the encoder first sends a primary frame (i.e. the primary encoded representation of a frame) in a first packet. With a certain time delay, the encoder then sends the "partial copy" (i.e. the encoded representation of the at least one error concealment parameter) in another packet which is sent later than the first packet. Accordingly, the encoder still quantizes the parameters but adds them to the bitstream in a later packet. Thus, the invention is particularly useful in packet-based networks, such as Voice-over-IP (VoIP), Voice-over-LTE (VoLTE) or the like. While the primary encoded representation of a frame may have already been transmitted to the decoder side, its corresponding error concealment parameters will be sent with one of the following transport packets. Thus, if the packet containing the primary encoded representation is lost, corrupted or delayed, the packet containing the error concealment parameters may, however, correctly arrive at the decoder side, as it has been sent later in time. Furthermore, by combining into one packet these error concealment parameters with a primary encoded representation of another frame, bandwidth can be efficiently used.

In an embodiment, the encoder may be configured to selectively choose between at least two modes for providing an encoded representation of error concealment parameters. Thus, the encoder is versatile as it provides different modes for handling different signals that may have different signal characteristics, wherein different sets of error concealment parameters may be provided in the different modes. As these two modes are used for providing an encoded representation of at least one error concealment parameter, these at least two modes are also referred to as partial copy modes.

In an embodiment, the encoder's selection of a mode for providing an encoded representation of the at least one error concealment parameter may be based on one or more parameters which comprise at least one of a frame class, a LTP pitch, a LTP gain and a mode for providing an encoded representation of the at least one error concealment parameter of one or more preceding frames. These parameters are well suited for deciding about a mode for an error concealment at the decoder side.

In an embodiment, at least one of the modes for providing an encoded representation of the at least one error concealment parameter may be a time domain concealment mode such that the encoded representation of the at least one error concealment parameter comprises one or more of a TCX LTP lag and a classifier information. For example, a first mode which is a time domain concealment mode could be selected if a time domain signal is present comprising at least a certain characteristic. Otherwise, if the time domain signal does not comprise this certain characteristic, or if the time domain signal comprises a different signal characteristic, a second mode is chosen. Thus, the encoder provides for a signal specific selection of the error concealment parameters.

In an embodiment, at least one of the modes for providing an encoded representation of the at least one error concealment parameter may be a time domain concealment mode that is selected if the audio content contained in the current frame contains a transient or if the global gain of the audio content contained in the current frame is lower than the global gain of the preceding frame. Thus, the encoder selectively chooses a mode for providing error concealment parameters which are used, at the decoder side, for concealing an unavailable primary encoded representation, even if this unavailable primary frame's signal characteristics deviate to a certain extent from the preceding frame's signal characteristic.

In an embodiment, at least one of the modes for providing an encoded representation of the at least one error concealment parameter may be a frequency domain concealment mode such that the encoded representation of the at least one error concealment parameter comprises one or more of an LSF parameter, a TCX global gain and a classifier information. This mode can selectively be chosen by the encoder for providing an encoded representation of the at least one error concealment parameter which parameter is well suited for providing, at the decoder side, a good concealment result of an unavailable primary encoded representation containing a frequency domain signal.

In an embodiment, the encoder may use at least a TCX coding scheme. According to this embodiment, the encoder advantageously uses TCX coding for efficiently encoding general audio content, music, background noise, or the like. Thus, the encoder can reliably determine and transmit TCX specific parameters that can be used for TCX concealment at the decoder side.

An embodiment creates a decoder for decoding audio content, wherein the decoder is configured to receive a primary encoded representation of a current frame and/or an encoded representation of at least one error concealment parameter for enhancing a decoder-sided error concealment of the current frame, wherein the decoder is configured to use the error concealment for at least partly reconstructing the audio content of the current frame by using the at least one error concealment parameter in the case that the primary encoded representation of the current frame is lost, corrupted or delayed. Generally, the decoder is able to receive a bitstream that could be either a single primary frame (i.e. primary encoded representation of a current frame) without any side data (i.e. at least one error concealment parameter) if the encoder decided to not send any side data for the specific past frame, or a primary frame (i.e. primary encoded representation of a current frame) and at least one or more error concealment parameters. Thus, the decoder can at least partially reconstruct a signal using these one or more error concealment parameters by using an error concealment, even if the primary encoded representation of that signal is defective, e.g. lost, corrupted or delayed. Accordingly, at least in some frames error concealment parameters (redundant coding parameters) are embedded in the bitstream and transmitted to the decoder side. Thus, it is not necessary to provide a partial copy of the entire signal, which is usually encoded at a lower bitrate and may therefore comprise a lower quality. Thus, the present invention provides for an improved concept to conceal defective, e.g. lost, corrupted or delayed frames by using selected error concealment parameters that are already selected at the encoder side, embedded in the bitstream and transmitted to the decoder side, when a concealment that uses information obtained on the basis of one or more previously decoded frames is "guided" (e.g. enhanced or improved) using the received error concealment parameters. Thus, the inventive concept keeps within a given bandwidth (by using an extrapolation-based error concealment which does not necessitate that all error concealment information is transmitted from an encoder to a decoder) while at the same time preserving a good quality of the decoded signal (by enhancing the error concealment using the error concealment parameters) even if the signal is reconstructed by concealment at the decoder side.

In an embodiment, the decoder-sided error concealment is an extrapolation-based error concealment. Accordingly, the concealment routine provided at the decoder side may use extrapolation in order to estimate or predict the future signal characteristics, which may further help and assist the concealment of defective primary frames.

In an embodiment, the decoder may be configured to extract the error concealment parameter of a current frame from a packet that is separated from a packet in which the primary encoded representation of the current frame is contained. Thus, by having two separate packets available, the decoder can use the error concealment parameter contained in one of these separate packets in case that the packet containing the primary encoded representation of the current frame is lost, corrupted or delayed.

In an embodiment, the decoder may be configured to selectively choose between at least two error concealment modes which use different encoded representations of one or more error concealment parameters for at least partially reconstructing the audio content using the extrapolation-based error concealment. The decoder chooses one of the at least two error concealment modes if the decoder does not get the respective mode, i.e. if the decoder cannot determine or otherwise retrieve the respective mode, from the partial copy (i.e. from the encoded representation of the at least one error concealment parameter). Otherwise, the concealment mode is dictated by the available partial copy, i.e. by the encoded representation of the at least one error concealment parameter. In this case, the encoder already made the choice, while the decoder uses the selected one the at least two modes. In other words, in CA-mode, the encoder decides on the appropriate concealment mode and prepares the partial copy accordingly. If a partial copy is available to the decoder and it should be used for enhancing the concealment, the decoder sticks to the decision made by the encoder, otherwise the info within the partial copy cannot be exploited properly. The decoder only decides itself on the concealment mode, if no partial copy is available or if the partial copy is not and/or should not be used for other reasons. Accordingly, the decoder provides for a signal specific decoding of one or more error concealment parameters and an enhanced error concealment.

In an embodiment, at least one of the error concealment modes which uses different encoded representations of one or more error concealment parameters may be a time domain concealment mode wherein the encoded representation of the at least one error concealment parameter comprises at least one of a TCX LTP lag and a classifier information. For example, a first mode which is a time domain concealment mode, could be selected if a time domain signal is present comprising at least a certain characteristic. Otherwise, if the time domain signal does not comprise this certain characteristic, or if the time domain signal comprises a different signal characteristic, a second mode is chosen. Thus, the encoder may provide for a signal specific selection of the error concealment parameters, when the decoder may follow this encoder's selection.

In an embodiment, at least one of the at least two error concealment modes which uses different encoded representations of one or more error concealment parameters may be a frequency domain concealment mode wherein the encoded representation of the at least one error concealment parameter comprises one or more of an LSF parameter, a TCX global gain and a classifier information. This mode can selectively be chosen by the decoder for providing a good concealment result of an unavailable primary encoded representation containing a frequency domain signal.

In an embodiment, the decoder may use at least a TCX coding scheme. According to this embodiment, the decoder advantageously uses TCX decoding for efficiently decoding general audio content, music, background noise, or the like. Thus, the decoder can use TCX specific error concealment parameters for reconstructing a TCX signal in case that the primary encoded representation has been lost, corrupted or delayed.

An embodiment creates an apparatus for error concealment, the apparatus being configured for performing a standard concealment mechanism for a lost frame and to use transmittable parameters to enhance the concealment. Thus, the present invention improves a standard concealment mechanism by using certain parameters.

An embodiment creates an apparatus for error concealment, the apparatus being configured for not having a partial copy that is just a low bitrate version of the primary, but for having a partial copy consisting of multiple key parameters for enhancing the concealment. Thus, bandwidth capacity can be efficiently used.

An embodiment creates an apparatus for error concealment having a receiver comprising a de-jitter buffer for providing a partial redundant copy of a current lost frame if it is available in any of the future frames, wherein the apparatus is configured for reading a partial redundant information bitstream and for updating corresponding parameters. Thus, if a current frame is lost, corrupted or delayed, the inventive apparatus can use the partial redundant copy which has been sent later in time, i.e. with a future frame, in order to reconstruct the frame.

An embodiment creates a switched Coder or decoder, in which there are two or more core coding schemes, whereas for example one uses ACELP for coding speech-like content and the second use TCX for coding general audio content wherein ACELP frames are processed using a partial redundant copy coding and TCX frames are processed using a different approach, wherein in frames that are close to a core coder switch, two special cases can occur, namely: ACELP primary frame with partial copy generated from future TCX frame on top, or TCX primary frame with partial copy generated from future ACELP frame on top, wherein, for these cases, both core coders are configurable to create primary frames in combination with partial copies from the other coder type, without infringing the necessitated total size of a frame, to assure a constant bitrate, or wherein: a first TCX frame after an ACELP frame, where, if this frame gets lost and thus is not available to the decoder, the proposed technique will TCX conceal the frame using partial copy information that has been transported in top of another frame, wherein concealment needs a preceding frame for extrapolating the signal content, ACELP concealment is used (as the previous frame was ACELP) and wherein it is decided already in the encoder, to not put a partial copy on top of a TCX frame after a switch, or where there is a signal-adaptive partial copy selection, where a signal is analyzed before encoding to determine if the usage of partial copy is favorable, wherein if the signal could be concealed satisfyingly well without the help of additional partial copy info within the decoder, but the clean channel performance suffers because of reduced primary frame, a partial copy usage is turned off or a specifically reduced partial copy is used within the encoder. Thus, the inventive coder or decoder is versatile as it provides for a combination of different coding schemes.

An embodiment creates a Transform Domain Coder or decoder, wherein an en-/decoding scheme is used, where at least in some frames redundant coding parameters are embedded in the bitstream and transmitted to the decoder side or wherein a redundant info is delayed by some time and embedded in a packet which is encoded and sent later in time such that the info can be used in the case of the decoder already having the future frame available, and the original frame is lost, corrupted or delayed even more. Thus, by providing redundant coding parameters in the bitstream, a given bandwidth can efficiently be used.

The Transform domain coder or decoder as before may use redundant information comprising ISF/LSF parameters: ISF/LSF parameter representation is used for quantization and coding of LPC parameters. In TCX the LPC is used to represent the masking threshold. This is an essential parameter and very helpful to have available correctly on decoder side in case of a frame loss. Especially if the ISF/LSFs are coded predictively the concealment quality will improve significantly by having this info available during concealment, because the predictor states on decoder side will stay correct (in sync to encoder) and this will lead to a very quick recovery after the loss; Signal classification: Signal classification is used for signaling the content types: UNVOICED, UNVOICED TRANSITION, VOICED TRANSITION, VOICED and ONSET. Typically this type of classification is used in speech coding and indicating if tonal/predictive components are present in the signal or if the tonal/predictive components are changing. Having this information available on the decoder side during concealment may help to determine the predictability of the signal and thus it can help adjusting the amplitude fade-out speed, the interpolation speed of the LPC parameters; TCX global gain/level: The global gain may be transmitted to easily set the energy of the concealed frame to the correct (encoder determined level) in case it is available; Window information like overlap length; or Spectral peak positions to help tonal concealment.

The terms “redundant”, “redundant copy”, “partial redundant copy” and other combinations of expressions containing the term “redundant” may be used in the sense of providing a “partial” information. A partial information does not contain a redundant, and possibly low-bitrate, representation of a primary-encoded frame, i.e. of an encoded audio signal. Instead, a partial information may contain or comprise parameters, in particular concealment helper parameters which enhance a concealment mechanism that is available at the decoder side, in order to conceal the corresponding primary frame, i.e. the primary-encoded audio data, in case that this primary-encoded frame is defective, e.g. lost, corrupted or delayed. In other words, the terms “redundant” and “partial”, and derivates thereof, such as e.g. “redundant copy” and “partial copy”, may be used interchangeably within this document, as both terms represent an information that may contain or comprise the aforementioned parameters.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
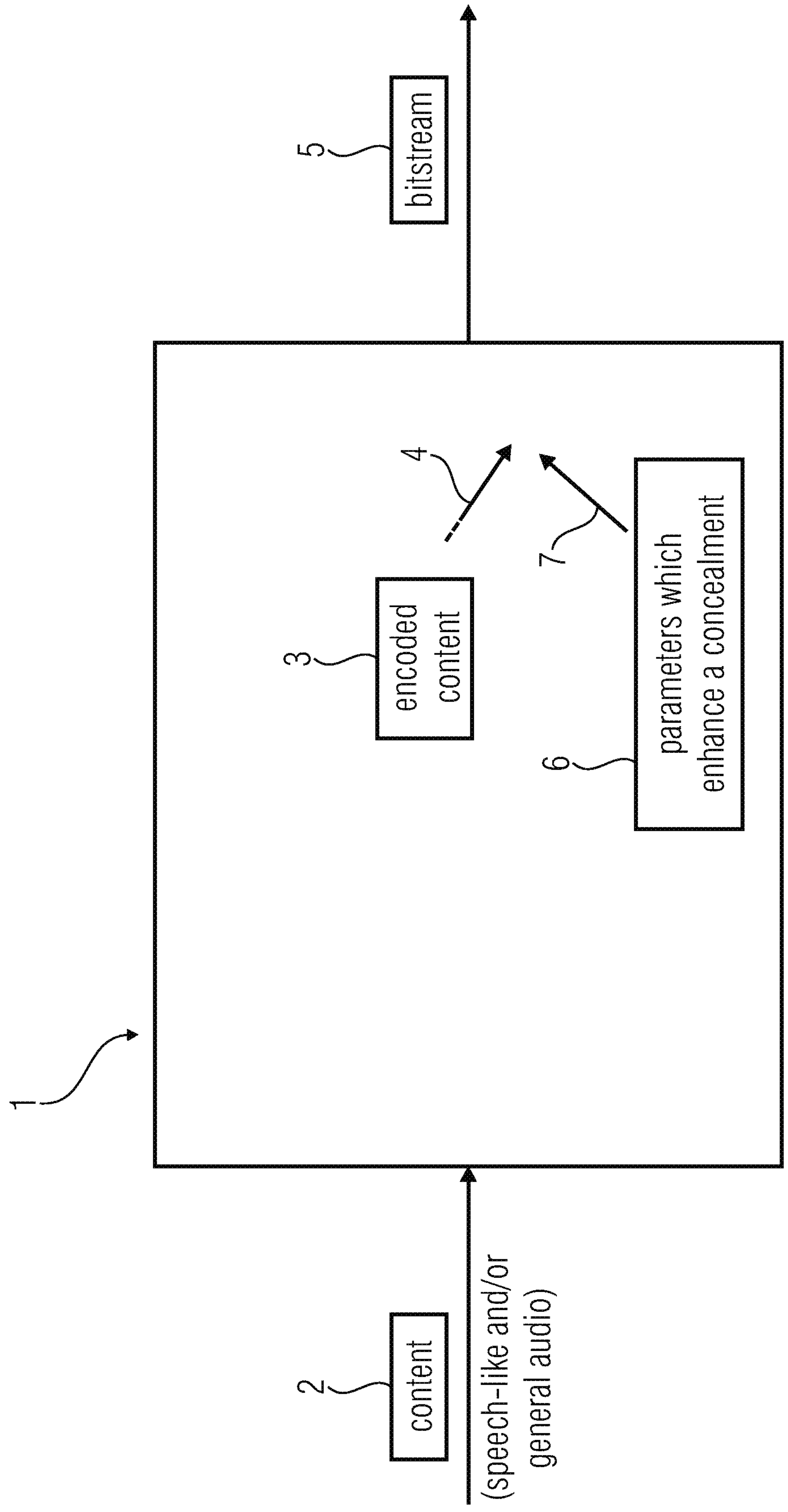
FIG. 1 shows a schematic representation of the inventive encoder.

FIG. 1 shows an inventive encoder 1. The encoder 1 is configured to encode audio content 2. In particular, the encoder 1 is configured to encode speech-like content and/or general audio content. The respective encoded audio content 3 is embedded, in at least a frame 4, into a bitstream 5.

The encoder 1 is further configured to embed, at least in some frames 7, parameters 6 in the bitstream 5. These parameters 6 are used to enhance a concealment in case an original frame 4 is lost, corrupted or delayed.

The bitstream 5 is sent to a receiver comprising a decoder.

Figure 2:
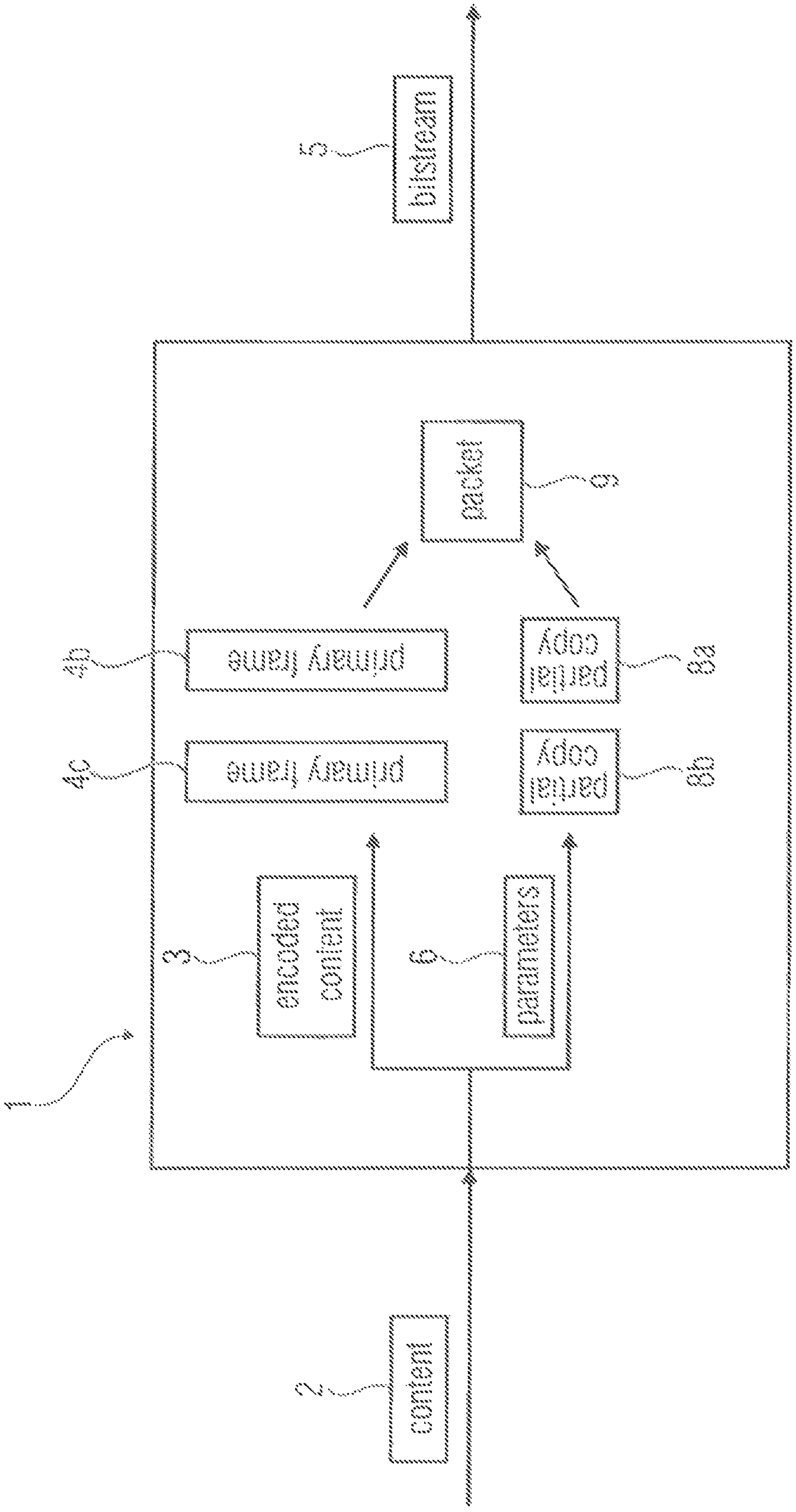
FIG. 2 shows a schematic representation of an embodiment of an inventive encoder.

As shown in FIG. 2, the encoder 1 is configured to create a primary frame 4*b* and a partial copy 8*b*. However, the partial copy 8*b* is not just a low bitrate version of the primary frame 4*b*. Instead, the partial copy 8*b* contains the parameters 6 which enhance the concealment at the decoder side, but, on the other hand, does not include full information for reconstructing an audio content of a defective, e.g. lost, corrupted or delayed primary frame. In other words, the partial copy includes one or more parameters to enhance a decoder-sided error concealment, but not all the information needed for the error concealment.

The encoder 1 is configured to delay the parameters 6 by some time and to embed the parameters 6 in a packet 9 which is encoded and sent later in time than a packet which comprises the primary frame 4*b*.

The encoder 1 may create one or more primary frames 4*b*, 4*c* and one or more partial copies 8*a*, 8*b*. For example, at least a certain part of the audio content 2 is encoded and embedded into a primary frame 4*b*. The same part of the audio content 2 is analyzed by the encoder 1 as to certain signal characteristics. Based thereupon, the encoder 1 determines a selection of the one or more parameters 6 which enhance a concealment on the decoder side. These parameters 6 are embedded in a corresponding "partial copy" 8*b*.

In other words, the primary frame 4*b* contains an encoded representation of at least a part of the audio content 2. The corresponding partial copy 8*b* contains one or more parameters 6 which are used by an error concealment at the decoder side in order to reconstruct the encoded representation of the audio content 2 in case the primary frame 4*b* is lost, corrupted or delayed.

The primary copy 4*b* is packed into the transport packet 9 together with a partial copy 8*a*, wherein the partial copy 8*a* is the partial copy of an audio content that has been encoded in a primary frame 4*a* which has already been sent earlier in time. Accordingly, the encoder 1 delayed the parameters 6 by some time. As can be further seen in FIG. 2, the partial copy 8*b* (belonging to primary frame 4*b*) that follows the partial copy 8*a* will be packed together with the primary frame 4*c* in a later transport packet. There may also be one or more further primary frames between the primary frames 4*c* and 4*b*.

It is an important feature that the concept described herein uses an en-/decoding scheme where at least in some frames 8*a*, 8*b* redundant coding parameters 6 are embedded in the bitstream 5 and transmitted to the decoder side. The redundant info (parameters 6) is delayed by some time and embedded in a packet 9 which is encoded and sent later in time such that the info can be used in the case of the decoder already has the future frame 4*b*, 8*a* available, but the original frame 4*a* is lost, corrupted or delayed even more.

The bitstream 5 may, for example, comprise a constant total bitrate. The encoder 1 may be configured to reduce a primary frame bitrate, i.e. a bitrate that is needed to encode a primary frame 4*b*, 4*c* when compared to the constant total bitrate. The bitrate reduction for the primary frames 4*b*, 4*c* and a partial redundant frame coding mechanism together determine a bitrate allocation between the primary and redundant frames (partial copies) 4*b*, 4*c*, 8*a*, 8*b* to be included within the constant total bitrate of the bitstream 5. Thus, the encoder 1 is configured to provide a packet 9 containing a primary frame 4*b* and a partial copy 8*a*, wherein the size, i.e. the bitrate of the packet 9 is at or below the constant total bitrate.

In other words, the primary Frame bit-rate reduction and partial redundant frame coding mechanisms together determine the bit-rate allocation between the primary and redundant frames 4*b*, 4*c*, 8*a*, 8*b* to be included within the constant total bitrate. The overall bit rate of a frame 4*b* holding partial copy parameters 8*a* (in addition to primary frames) is not increased.

TCX-Coding Scheme

According to an embodiment, the encoder 1 is part of a codec using a TCX coding scheme. The inventive encoder 1 may use TCX for coding general audio content. In case of TCX, the partial copy 8*a*, 8*b* is used to enhance a frame loss algorithm of an error concealment at the decoder side by transmitting some helper parameters 6.

When using a transform domain codec, embedding redundant info 8*a*, 8*b* to TCX frames 4*b*, 4*c* may be chosen if:

- The Frame contains a really noisy audio signal. This may be indicated by a low auto correlation measure or by the Frame classificator output being UNVOICED or UNVOICED TRANSITION. UNVOICED or UNVOICED TRANSITION classification indicates a low prediction gain.
- The frame contains a noise floor with sharp spectral lines which are stationary over a longer period of time. This may be detected by a peak detection algorithm which is searching for local maxima in the TCX spectrum (power spectrum or real spectrum) and comparing the result with the result of the peak detection of the previous Frame. In case the peaks did not move it is likely that there are stationary tones which can easily be concealed after having concealed the noise spectrum by post processing the spectrum with a phase extrapolator called tonal concealment.

In case LTP info is present and the lag is stable over the actual and the past Frame Tonal concealment [6] should be applied at the decoder.

Redundant information (parameters 6) may be:

ISF/LSF parameters:

ISF/LSF parameter representation is used for quantization and coding of LPC parameters. In TCX the LPC is used to represent the masking threshold. This is an important parameter and very helpful to have available correctly on decoder side in case of a frame loss. Especially if the ISF/LSFs are coded predictively the concealment quality will improve significantly by having this info available during concealment, because the predictor states on decoder side will stay correct (in sync to encoder) and this will lead to a very quick recovery after the loss.

Signal classification:

Signal classification is used for signaling the content types: UNVOICED, UNVOICED TRANSITION, VOICED TRANSITION, VOICED and ONSET. Typically this type of classification is used in speech coding and indicating if tonal/predictive components are present in the signal or if the tonal/predictive components are changing. Having this information available on the decoder side during concealment may help to determine the predictability of the signal and thus it can help adjusting the amplitude fade-out speed, the interpolation speed of the LPC parameters.

TCX global gain/level:

The global gain may be transmitted to easily set the energy of the concealed frame to the correct (encoder determined) level in case it is available.

Window information like overlap length.

Spectral peak positions to help tonal concealment

There is a special case where, at the encoder 1 for frequency domain partial copy, it is checked if the signal 2 contains an onset. If the gain (could be quantized) of the actual frame 4*c* is more than a certain factor (e.g. 1.6) time the gain of the previous frame 4*b* and the correlation between the actual frame 4*c* and the previous frame 4*b* is low, only a limited (clipped) gain is transmitted. This avoids getting pre echo artefacts in case of concealment. In case of Onset the previous frame 4*b* is really uncorrelated to the actual frame 4*c*. Thus, it cannot be relied on the gain computed on the actual frame 4*c* if concealment is done based on the previous frame 4*b* spectral bins.

Switched Codec Scheme (TCX-ACELP)

Figure 3:
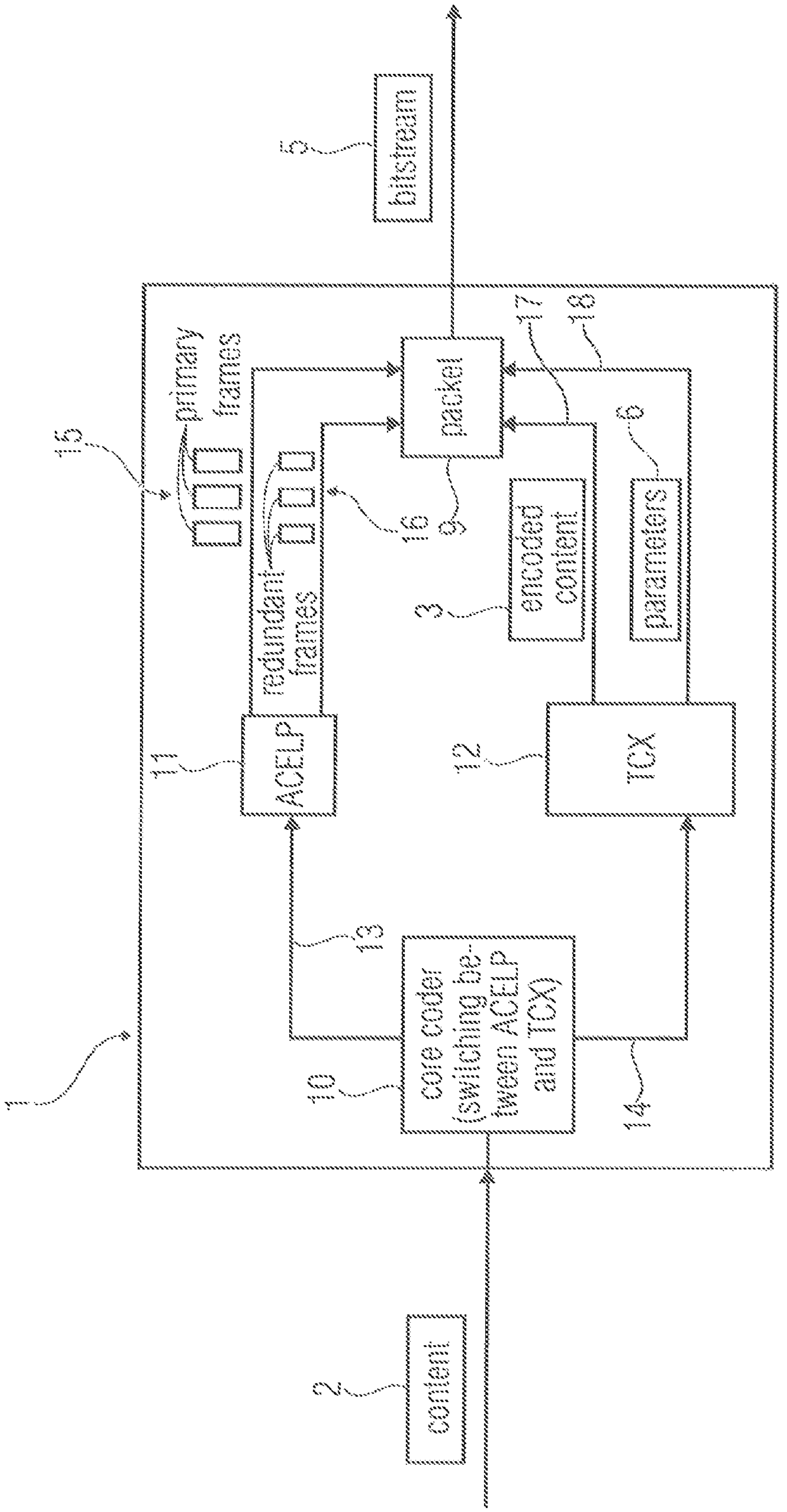
FIG. 3 shows a schematic representation of an embodiment of an inventive encoder.

In a further embodiment, the encoder 1 is part of a switched codec, wherein the switched codec consists of at least two core coding schemes. A first core coding scheme uses ACELP and a second core coding scheme uses TCX. With reference to FIG. 3, the encoder 1 comprises a core coder 10 which can switch between ACELP and TCX core coding schemes.

The encoder further comprises an ACELP processor 11 for processing ACELP-coded content 13, and a TCX processor 12 for processing TCX-coded content 14. The ACELP processor 11 is a commonly known processor using a conventional partial copy approach, wherein primary frames 15 are primary coded and redundant frames 16 are redundant-coded. The redundant frames 16 are a low-bitrate version of their corresponding primary frames 15.

The TCX processor 12 processes frames that have been encoded according to the inventive concept. In a first branch 17, the encoded content 3 is provided in the form of primary frames 4*b*, 4*c*. In a second branch 18, the parameters 6 which enhance the concealment are provided in the form of "partial copies" 8*a*, 8*b*, such as shown in FIG. 2. Both the ACELP content 15, 16 and the TCX content 17, 18 are packed into a sequence of transport packets 9, as described before, and sent in the bitstream 5 to the decoder side.

Still with reference to FIG. 3, but stated in different words, the usage of the inventive concept is described in combination with a state of the art partial redundant copy based approach in a switched coding system. Such a system consists of two (or more) core coding schemes, whereas one uses ACELP for coding speech-like content and the second use TCX for coding general audio content.

Assuming ACELP frames 15, 16 are processed using traditional partial redundant copy coding and TCX frames 4*b*, 4*c*, 8*a*, 8*b* are processed using the inventive approach, two main cases will occur, where no special action is needed and the frames 4*b*, 4*c*, 8*a*, 8*b*, 15, 16 can be processed using the underlying core coder's 10 partial copy approach:

ACELP primary frame 15 with partial copy 16 generated from future ACELP frame on top TCX primary frame 4*c* with partial copy 8*b* generated from future TCX frame 4*b* on top However, in frames that are close to a core coder switch, two special cases can occur, namely ACELP primary frame 15 with partial copy 8 generated from future TCX frame on top TCX primary frame 4 with partial copy 16 generated from future ACELP frame on top For these cases, both core coders need to be configurable to create primary frames 4, 15 in combination with partial copies 8, 16 from the other coder type, without infringing the necessitated total size of a frame, to assure a constant bitrate.

Accordingly, the encoder 1 is configured to create a primary frame 4, 15 of one of the speech-like content type (ACELP) and the general audio content type (TCX) in combination with a partial copy 8, 16 of the other one of the speech-like content type and the general audio content type.

However, there are more specific cases, where a more sophisticated selection of partial copies 8, 16 is appropriate, e.g.:

First TCX Frame 4 after an ACELP Frame 15:

If this frame 4 gets lost and thus is not available to the decoder, the inventive technique will TCX-conceal the frame 4 using partial copy information (parameters 6) that has been transported in top of another (hopefully not lost) frame. But as concealment needs a preceding frame for extrapolating the signal content, it is of advantage in this case to use ACELP concealment (as the previous frame was ACELP) which would make a TCX partial copy unnecessary. Thus it is decided already in the encoder 1, to not put a partial copy 8 on top of a TCX frame 4 after a switch.

Accordingly, the encoder 1 is configured to not put a partial copy 8 on top of a TCX frame 4 after a switch when there is a first TCX frame 4 after an ACELP frame 15.

Signal-Adaptive Partial Copy Selection

The signal (audio content) 2 can be analyzed before encoding to determine if the usage of the inventive partial copy (using parameters 6) is favorable. For example, if the signal 2 could be concealed satisfyingly well without the help of additional partial copy info, i.e. parameters 6, within the decoder, but the clean channel performance suffers because of reduced primary frame 4, the inventive partial copy usage (i.e. embedding parameters 6 in the bitstream 5) can be e.g. turned off or a specifically reduced partial copy 8 can be used within the encoder 1.

Accordingly, the encoder 1 is configured to analyze the signal 2 before encoding and to turn off the partial copy usage or to provide a reduced partial copy based on the analyzed signal 2.

Generally, the encoder 1 is configured to provide partial redundant copies 8 which are constructed in a partial copy mode. In an embodiment, the encoder 1 is configured to choose between multiple partial copy modes which use different amounts of information and/or different parameter sets, wherein the selection of the partial copy mode is based on various parameters.

Construction of Partial Redundant Frame for TCX Frame

In case of TCX partial redundant frame type, a partial copy 8 consisting of some helper parameters 6 is used to enhance the frame loss concealment algorithm. In an embodiment, there are three different partial copy modes available, which are RF_TCXFD, RF_TCXTD1 and RF_TCX_TD2. Similar to the PLC mode decision on the decoder side, the selection of the partial copy mode for TCX is based on various parameters such as the mode of the last two frames, the frame class, LTP pitch and gain. The parameters used for the selection of the mode may be equal to or different from the parameters for enhancing the concealment which are included in the "partial copy".

a) Frequency Domain Concealment (RF_TCXFD) Partial Redundant Frame Type

According to an embodiment, at least one of the multiple partial copy modes is a frequency domain ("FD") concealment mode, an example of which is described in the following. 29 bits are used for the RF_TCXFD partial copy mode.

- 13 bits are used for the LSF quantizer (e.g. for coding LPC parameters) which is the same as used for regular low rate TCX coding.
- The global TCX gain is quantized using 7 bits.
- The classifier info (e.g. VOICED, UNVOICED, etc.) is coded on 2 bits.

b) Time Domain Concealment (RF TCXTD1 and RF TCXTD2) Partial Redundant Frame Type According to an embodiment, at least two of the multiple partial copy modes are different time domain ("TD") concealment modes, an example of which is described in the following. A first time domain concealment mode, namely the partial copy mode RF_TCXTD1 is selected if a frame **4*c* contains a transient or if the global gain of the frame 4*c* is (much) lower than the global gain of the previous frame 4*b***. Otherwise, the second time domain concealment mode, namely RF_TCXTD2 is chosen.

Overall 18 bits of side data are used for both modes.

- 9 bits are used to signal the TCX LTP (Long Term Prediction) lag
- 2 bits for signaling the classifier info (e.g. VOICED, UNVOICED, etc.)

Time Domain Concealment

Depending on the implementation, the codec could be a transform domain codec only or a switch codec (transform/time domain) using the time domain concealment described in [4] or [5]. Similar to the therein described packet loss concealment mode decision on the decoder side, the selection of the partial copy mode according to the present invention is based on various parameters, as mentioned above, e.g. the mode of the last two frames, the frame class, LTP pitch and gain.

In the case time domain mode is chosen, the following parameters 6 can be transmitted:

- In the case LTP data is present, the LTP lag is transmitted,
- a classifier info is signaled (UNVOICED, UNVOICED TRANSITION, VOICED, VOICED TRANSITION, ONSET . . . ): Signal classification is used for signaling the content types: UNVOICED, UNVOICED TRANSITION, VOICED TRANSITION, VOICED and ONSET. Typically this type of classification is used in speech coding and indicating if tonal/predictive components are present in the signal or if the tonal/predictive components are changing. Having this information available on the decoder side during concealment may help to determine the predictability of the signal and thus it can help adjusting the amplitude fade-out speed, the interpolation speed of the LPC parameters and it can control possible usage of high- or low pass filtering of voiced or unvoiced excitation signals (e.g. for denoising).

Optionally, also at least one of the following parameters 6 can be transmitted:

- LPC parameters describing the full spectral range in case of bandwidth extension is used for regular coding,
- LTP Gain,
- Noise level, and
- Pulse position Most of the parameters 6 sent, are directly derived from the actual frame 4 coded in the transform domain, so there is no additional complexity caused. But if the complexity is not an issue, then a concealment simulation at the encoder 1 can be added to refine the variable 6 that can be sent.

As mentioned above, also multiple modes for the provision of the partial copy 8 can be used. This permits to send different amounts of information or different parameter sets. For example, there are two modes for the time domain (TD). The partial copy mode TD1 could be selected if the frame **4*c* contains a transient or if the global gain of the frame 4*c* is much lower than the global gain of the previous frame 4*b*. Otherwise TD2 is chosen. Then at the decoder, the pitch gain and the code gain will be decreased with two different factors (0.4 and 0.7 accordingly) to avoid having a long stationary signal whenever the original signal 2** was more transient like.

Multiple Frame Loss

There is a further special case, namely the case of multiple frame loss. The pitch decoded from the partial copy **8*b* shall not be taken into account if the previous frame 4*a* is lost, because the pitch sent in the bitstream 5 was computed on the encoder side based on the ground truth, but if the previous frame 4*a*** is lost, the synthesis of the previously lost and concealed synthesis might be really different to the encoder ground truth. So it is better in general to not risk relying on the synchronicity of en-/decoder in case of multiple frame loss and fix the pitch to the predicted pitch for the following lost frame instead of using the pitch transmitted.

The inventive concept of the encoder 1 shall be summarized in the following with reference to an embodiment as shown FIG. 4.

The encoder 1 receives an input signal which contains audio content 2. The audio content 2 may be speech-like content and/or general audio content such as music, background noise or the like.

The encoder 1 comprises a core coder 10. The core coder 10 can use a core coding scheme for encoding speech-like content, such as ACELP, or a core coding scheme for encoding general audio content, such as TCX. The core coder 10 may also form part of a switched codec, i.e. the core coder 10 can switch between the speech-like content core coding scheme and the general audio content core coding scheme. In particular, the core coder 10 can switch between ACELP and TCX.

As indicated in branch 20, the core coder 10 creates primary frames 4 which comprise an encoded representation of the audio content 2.

The encoder 1 may further comprise a partial redundant frame provider 21. As indicated in branch 30, the core coder 10 may provide one or more parameters 6 to the partial redundant frame provider 21. These parameters 6 are parameters which enhance a concealment at the decoder side.

Additionally or alternatively, the encoder 1 may comprise a concealment parameter extraction unit 22. The concealment parameter extraction unit 22 extracts the concealment parameters 6 directly from the audio signal, i.e. from the content 2, as indicated in branch 40. The concealment parameter extraction unit 22 provides the extracted parameters 6 to the partial redundant frame provider 21.

The encoder 1 further comprises a mode selector 23. The mode selector 23 selectively chooses a concealment mode, which is also called partial redundant copy mode. Depending on the partial redundant copy mode, the mode selector 23 determines which parameters 6 are suitable for an error concealment at the decoder side.

Therefore, the core coder 10 analyzes the signal, i.e. the audio content 2 and determines, based on the analyzed signal characteristics, certain parameters 24 which are provided to the mode selector 23. These parameters 24 are also referred to as mode selection parameters 24. For example, mode selection parameters can be at least one of a frame class, the mode of the last two frames, LTP pitch and LTP gain. The core coder 10 provides these mode selection parameters 24 to the mode selector 23.

Based on the mode selection parameters 24, the mode selector 23 selects a partial redundant copy mode. The mode selector 23 may selectively choose between three different partial redundant copy modes. In particular, the mode selector 23 may selectively choose between a frequency domain partial redundant copy mode and two different time domain partial redundant copy modes, e.g. TD1 and TD2, for example as described above.

As indicated in branch 50, the mode selection information 25, i.e. the information regarding the selected partial redundant copy mode, is provided to the partial redundant frame provider 21. Based on the mode selection information 25, the partial redundant frame provider 21 selectively chooses parameters 6 that will be used, at the decoder side, for error concealment. Therefore, the partial redundant frame provider 21 creates and provides partial redundant frames 8 which contain an encoded representation of said error concealment parameters 6.

Stated differently, the partial redundant frame provider 21 provides signal specific partial redundant copies. These partial redundant copies are provided in partial redundant frames 8, wherein each partial redundant frame 8 contains at least one error concealment parameter 6.

As indicated at the branches 20 and 60, the encoder 1 combines the primary frames 4 and the partial redundant frames 8 into the outgoing bitstream 5. In the case of a packet-based network, primary frames 4 and partial redundant frames 8 are packed together into a transport packet, which is sent in the bitstream to the decoder side. However, it is to be noted that the primary frame 4*c* of a current audio frame is packed into a packet 9 together with a partial redundant frame 8*b* (containing only the parameters 6 for enhancing a concealment) of a previous frame (i.e. a frame that has already been sent earlier in time).

The bitstream 5 comprises a constant total bitrate. In order to ensure that the bitstream 5 is at or below the constant total bitrate, the encoder 1 controls the bitrate of the transport packet containing the combination of the primary frame and the partial redundant frame 8. Additionally or alternatively, the encoder 1 may comprise a bitrate controller 26 that takes over this functionality.

In other words, the encoder 1 is configured to combine an encoded representation 8 of the at least one concealment parameter 6 of a current frame with a primary encoded representation 4 of a future frame (i.e. a frame that will be sent later in time than the current frame). Thus, the encoded representation 8 of the at least one error concealment parameter 6 of a current frame is sent with a time delay relative to the primary encoded representation 4 of this current frame.

Figure 4:
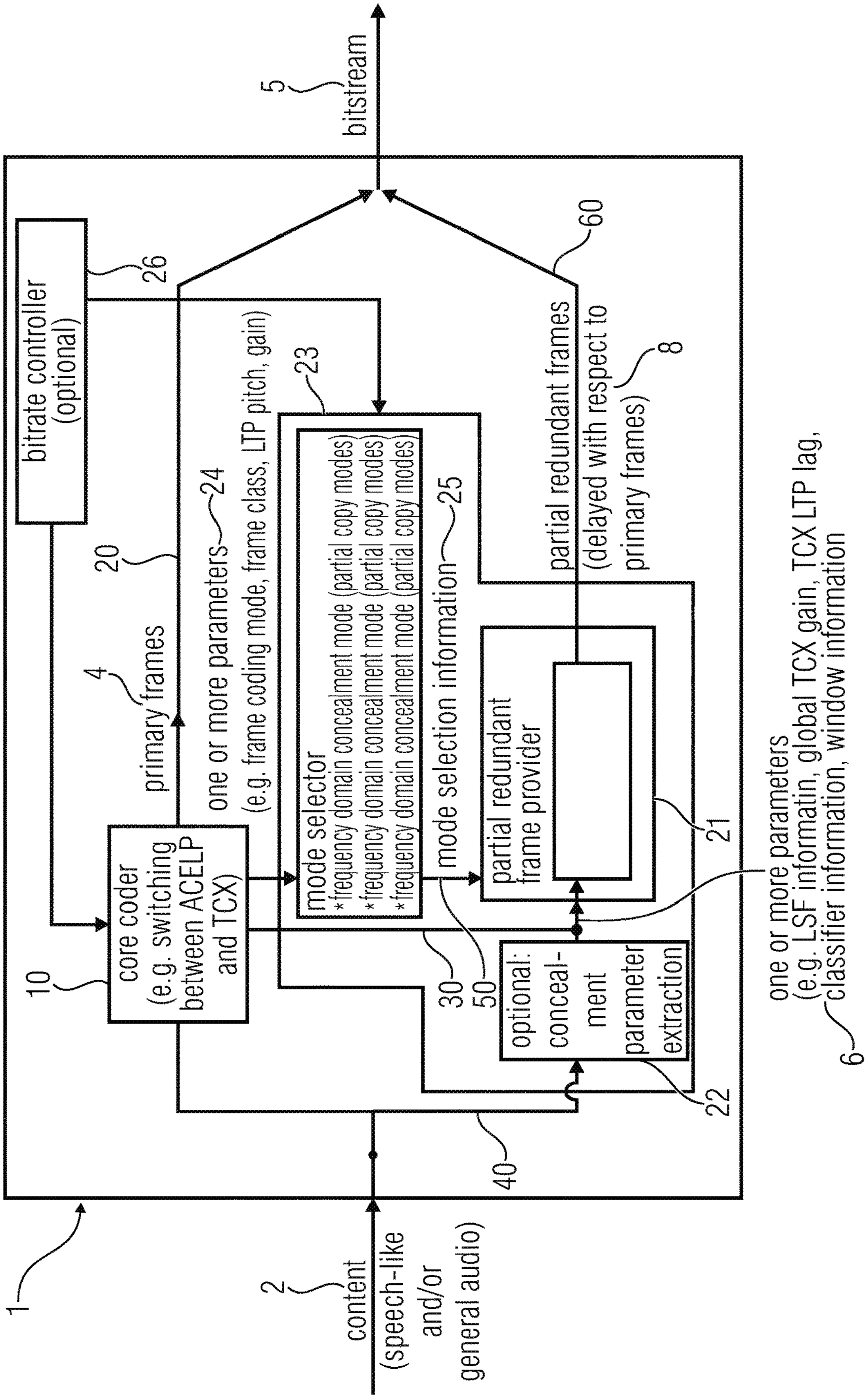
FIG. 4 shows a schematic representation of an embodiment of an inventive encoder.

Stated differently, and still with reference to FIG. 4, in a first step, content 2*a* is encoded and provided as a primary frame 4*a*. Its corresponding one or more error concealment parameters 6*a* are selected and provided as a partial redundant frame 8*a*. Then, in a second step, a subsequent content 2*b* is encoded and provided as a (subsequent) primary frame 4*b* and its one or more error concealment parameters 6*b* are selected and provided as a (subsequent) partial redundant frame 8*b*. Now, the encoder 1 combines the partial redundant frame 8*a* (of the current content) with the primary frame 4*b* (of the subsequent content) into a common transport packet 9*b*. Accordingly, if the preceding packet 9*a* containing primary frame 4*a* is lost, corrupted or delayed, its partial redundant frame 8*a*, which is sent later in time within the above mentioned subsequent transport packet 9*b* (containing partial redundant frame 8*a* and primary frame 4*b*), can be used at the decoder side for concealment of the audio content that was originally contained in an encoded representation in (defective) primary frame 4*a*.

Description of the Decoder

Figure 5:
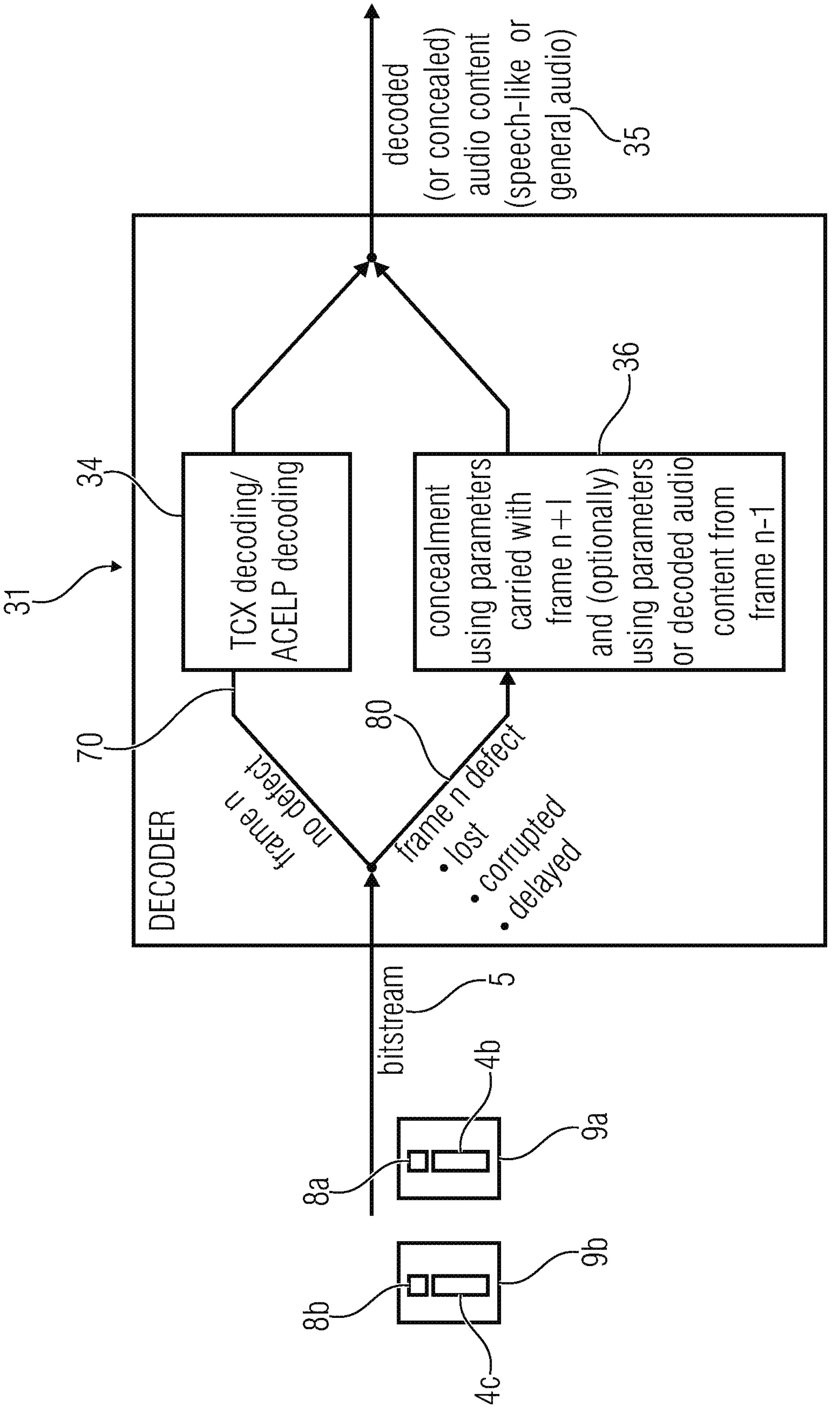
FIG. 5 shows a schematic representation of an embodiment of an inventive decoder.

According to an embodiment, the invention uses packet-switched, or packet-based networks. In this case, frames are sent in transport packets 9*a*, 9*b*, as shown in FIG. 5. Transport packet 9*a* contains a primary frame 4*b* and a partial copy 8*a*. Transport packet 9*b* contains a primary frame 4*c* and a partial copy 8*b*.

Stated differently, a partial copy 8*a* is an encoded representation of at least one error concealment parameter 6 of a current frame. The at least one error concealment parameter 6 has been selectively chosen by the encoder 1, as described before with reference to FIGS. 1 to 4. The at least one error concealment parameter 6 enhances a concealment at the decoder 31, as will be described in more detail below.

At the decoder 31, there may be two different cases regarding the transmitted frames 4, 8 or transport packets 9*a*, 9*b*, respectively.

Standard Decoding of Primary Encoded Representations

In a first case, indicated by branch 70, the transmitted transport packets 9*a*, 9*b* are received in the correct order, i.e. in the same order as they have been sent at the encoder side.

The decoder 31 comprises a decoding unit 34 for decoding the transmitted encoded audio content 2 contained in the frames. In particular, the decoding unit 34 is configured to decode the transmitted primary encoded representations 4*b*, 4*c* of certain frames. Depending on the encoding scheme of the respective frame, the decoder 31 may use the same scheme for decoding, i.e. a TCX decoding scheme for general audio content or an ACELP decoding scheme for speech-like content. Thus, the decoder 31 outputs a respectively decoded audio content 35.

Enhanced Error Concealment Using Encoded Representations of at Least One Error Concealment Parameter A second case may occur if a primary encoded representation 4 of a frame is defective, i.e. if a primary encoded representation 4 is lost, corrupted or delayed (for example because the transport packet 9*a* is lost, corrupted or delayed longer than a buffer length of the decoder), such as indicated by branch 80. The audio content will then have to be at least partly reconstructed by error concealment.

Therefore, the decoder 31 comprises a concealment unit 36. The concealment unit 36 may use a concealment mechanism which is based on a conventional concealment mechanism, wherein, however, the concealment is enhanced (or supported) by one or more error concealment parameters 6 received from the encoder 1. According to an embodiment of the invention, the concealment unit 36 uses an extrapolation-based concealment mechanism, such as described in patent applications [4] and [5], which are incorporated herein by reference.

Said extrapolation-based error concealment mechanism is used in order to reconstruct audio content that was available in a primary encoded representation 4 of a frame, in the case that this primary encoded representation 4 is defective, i.e. lost, corrupted or delayed. The inventive concept uses the at least one error concealment parameter 6 to enhance these conventional error concealment mechanisms.

This shall be explained in more detail with reference to the embodiment shown in FIG. 5. The decoder 31 normally receives a transport packet 9*a* and a transport packet 9*b*. Transport packet 9*a* contains a primary encoded representation 4*b* of a current frame and an encoded representation 8*a* of at least one error concealment parameter 6 of a preceding frame (not shown). Transport packet 9*b* contains an encoded representation 8*b* of at least one error concealment parameter 6 of the current frame for enhancing a decoder-sided extrapolation-based error concealment of the current frame. Transport packet 9*b* further contains a primary encoded representation 4*c* of a subsequent frame, i.e. a frame following (directly or with one or more frames in between) the current frame.

Stated differently, the encoded representation 8*b* of the at least one error concealment parameter 6 for reconstructing the defective audio content of the current frame is contained in transport packet 9*b*, while the primary encoded representation 4*b* of this current frame is contained in transport packet 9*a*.

If it is detected by the decoder 31 that, for example, the primary encoded representation 4*b* of the current frame is defective, i.e. lost, corrupted or delayed, the defective audio content is reconstructed by using the afore-mentioned available error concealment mechanism. According to the present invention, the available error concealment mechanism is enhanced by using the at least one error concealment parameter 6 during error concealment.

For this reason, the decoder 31 extracts the at least one error concealment parameter 6 from the encoded representation 8*b* contained in transport packet 9*b*. Based on the at least one parameter 6 that has been extracted, the decoder 31 selectively chooses between at least two concealment modes for at least partially reconstructing the defective audio content (in the sense that a concealed audio content is provided which is expected to be somewhat similar to the audio content of the lost primary encoded representation). In particular, the decoder 31 can choose between a frequency domain concealment mode and at least one time domain concealment mode.

Frequency Domain Concealment (RF TCXFD) Partial Redundant Frame Type

In case of a frequency domain concealment mode, the encoded representation 8*b* of the at least one error concealment parameter 6 comprises one or more of an ISF/LSF parameter, a TCX global gain, a TCX global level, a signal classifier information, a window information like overlap length and spectral peak positions to help tonal concealment.

The respective extracted one or more parameters 6 are fed to the error concealment unit 36 which uses the at least one parameter 6 for enhancing the extrapolation-based error concealment in order to at least partially reconstruct the defective audio content. As a result, the decoder 31 outputs the concealed audio content 35.

An embodiment of the present invention, which uses an example of a frequency domain concealment, is described below, wherein 29 bits are used for the RF_TCXFD partial copy mode (i.e. 29 bits are included in the encoded representation of error concealment parameters 6 and are used by the concealment unit 36).

13 bits are used for the LSF quantizer which is the same as used for regular low rate TCX coding.

The global TCX gain is quantized using 7 bits.

The classifier info is coded on 2 bits.

Time Domain Concealment (RF TCXTD1 and RF TCXTD2) Partial Redundant Frame Type

In case of a time domain concealment mode, the decoder 31 may selectively choose between at least two different time domain concealment modes in order to at least partially reconstruct the defective audio content.

For example, a first mode RF_TCXTD1 is selected if the frame contains a transient or if the global gain of the frame is much lower than the global gain of the previous frame. Otherwise, a second mode RF_TCXTD2 is chosen.

In case of a time domain concealment mode, the encoded representation 8*b* of the at least one error concealment parameter 6 comprises one or more of an LSF parameter, a TCX LTP lag, a classifier information, LPC parameters, LTP gain, Noise Level and Pulse Position. The respective extracted one or more parameters 6 are fed to the error concealment unit 36 which uses the at least one parameter 6 for enhancing the extrapolation-based error concealment in order to at least partially reconstruct (or approximate) the defective audio content. As a result, the decoder 31 outputs the concealed audio content 35.

An embodiment of the present invention, which uses an example of a time domain concealment, is described below, wherein Overall 18 bits of side data (i.e. of parameters 6) are used for both modes.

9 bits are used to signal the TCX LTP lag 2 bits for signaling the classifier info The decoder 31 may be part of a codec using a TCX decoding scheme for decoding and/or concealing TCX frames, as described above. The decoder 31 may also be part of a codec using an ACELP coding scheme for decoding and/or concealing ACELP frames. In case of ACELP coding scheme, the encoded representation 8*b* of the at least one error concealment parameter 6 may comprise one or more of adaptive codebook parameters and a fixed codebook parameter.

According to the invention, in the decoder 31 the type of the encoded representation of the at least one error concealment parameter 6 of a current frame 4*b* is identified and decoding and error concealment is performed based on whether only one or more adaptive codebook parameters (e.g. ACELP), only one or more fixed codebook parameters (e.g. ACELP), or one or more adaptive codebook parameters and one or more fixed codebook parameters, TCX error concealment parameters 6, or Noise Excited Linear Prediction parameters are coded. If the current frame 4*b* or a previous frame 4*a* is concealed by using an encoded representation of at least one error concealment parameter 6 of the respective frame, the at least one error concealment parameter 6 of the current frame 4*b*, such as LSP parameters, the gain of adaptive codebook, fix codebook or the BWE gain, is firstly obtained and then processed in combination with decoding parameters, classification information or spectral tilt from previous frames of the current frame 4*b*, or from future frames of the current frame 4*b*, in order to reconstruct the output signal 35, as described above. Finally, the frame is reconstructed based on the concealment scheme (e.g. time-domain concealment or frequency-domain concealment). The TCX partial info is decoded, but in contrast to an ACELP partial copy mode, the decoder 31 is run in concealment mode. The difference to the above described conventional extrapolation-based concealment is that the at least one error concealment parameter 6 which is available from the bitstream 5 is directly used and not derived by said conventional concealment.

First EVS-Embodiment

The following description passages provide a summary of the inventive concept with respect to the synergistic interaction between encoder 1 and decoder 31 using a so-called EVS (Enhanced Voice Services) Codec.

Introduction to EVS-Embodiment

EVS (Enhanced Voice Services) offers partial redundancy based error robust channel aware mode at 13.2 kbps for both wideband and super-wideband audio bandwidths. Depending on the criticality of the frame, the partial redundancy is dynamically enabled or disabled for a particular frame, while keeping a fixed bit budget of 13.2 kbps.

Principles of Channel Aware Coding

In a VoIP system, packets arrive at the decoder with random jitters in their arrival time. Packets may also arrive out of order at the decoder. Since the decoder expects to be fed a speech packet every 20 msec to output speech samples in periodic blocks, a de-jitter buffer [6] is necessitated to absorb the jitter in the packet arrival time. Larger the size of the de-jitter buffer, the better is its ability to absorb the jitter in the arrival time and consequently, fewer late arriving packets are discarded. Voice communications is also a delay critical system and therefore it becomes essential to keep the end to end delay as low as possible so that a two way conversation can be sustained.

The design of an adaptive de-jitter buffer reflects the above mentioned trade-offs. While attempting to minimize packet losses, the jitter buffer management algorithm in the decoder also keeps track of the delay in packet delivery as a result of the buffering. The jitter buffer management algorithm suitably adjusts the depth of the de-jitter buffer in order to achieve the trade-off between delay and late losses.

Figure 6:
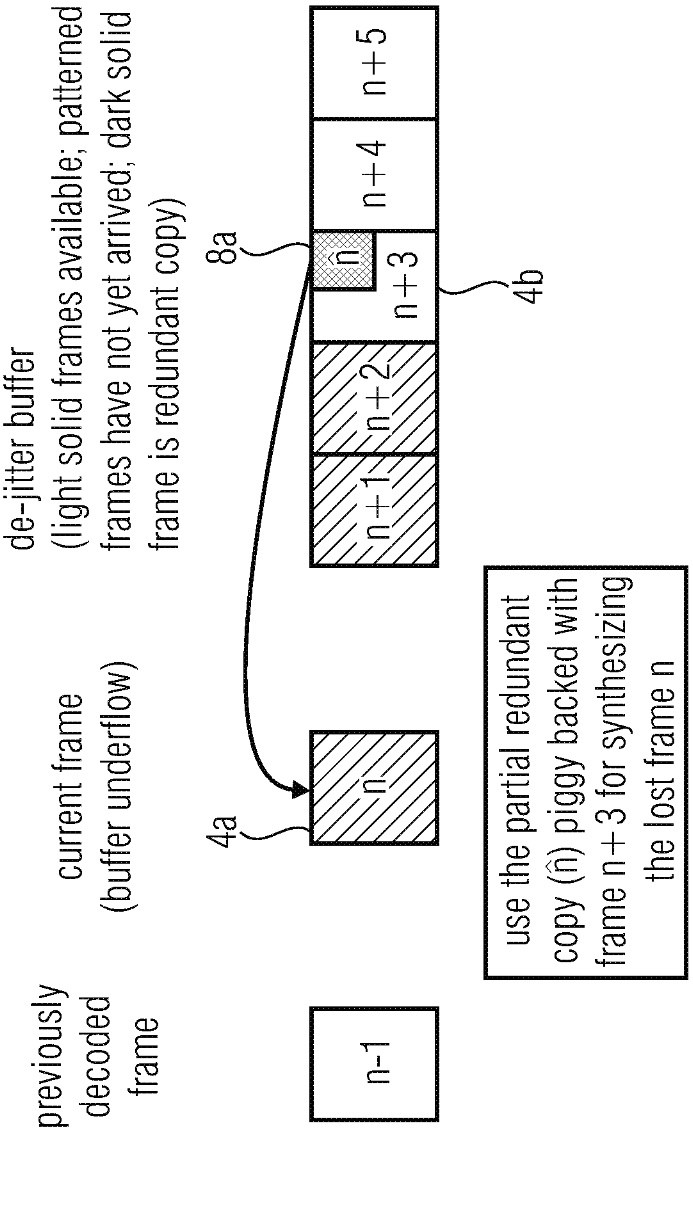
FIG. 6 shows a schematic representation of an embodiment showing a concept of partial redundancy in channel aware mode.

With reference to FIG. 6, EVS channel aware mode uses partial redundant copies 8*a* of current frames 4*a* along with a future frame 4*b* for error concealment. The partial redundancy technology transmits partial copies 8*a* of the current frame 4*a* along with a future frame 4*b* with the hope that in the event of the loss of the current frame 4*a* (either due to network loss or late arrival) the partial copy 8*a* from the future frame 4*b* can be retrieved from the jitter buffer to improve the recovery from the loss.

The difference in time units between the transmit time of the primary copy 4*a* of a frame and the transmit time of the redundant copy 8*a* of the frame (piggy backed onto a future frame 4*b*) is called the FEC offset. If the depth of the jitter buffer at any given time is at least equal to the FEC offset, then it is quite likely that the future frame is available in the de-jitter buffer at the current time instance. The FEC offset is a configurable parameter at the encoder which can be dynamically adjusted depending on the network conditions.

The concept of partial redundancy in EVS with FEC offset equal to [7] is shown in FIG. 6. The redundant copy 8*a* is only a partial copy that includes just a subset of parameters that are most critical for decoding or arresting error propagation.

The EVS channel aware mode transmits redundancy in-band as part of the codec payload as opposed to transmitting redundancy at the transport layer (e.g., by including multiple packets in a single RTP payload). Including the redundancy in-band allows the transmission of redundancy to be either channel controlled (e.g., to combat network congestion) or source controlled. In the latter case, the encoder can use properties of the input source signal to determine which frames are most critical for high quality reconstruction at the decoder and selectively transmit redundancy for those frames only. Another advantage of in-band redundancy is that source control can be used to determine which frames of input can best be coded at a reduced frame rate in order to accommodate the attachment of redundancy without altering the total packet size. In this way, the channel aware mode includes redundancy in a constant-bit-rate channel (13.2 kbps).

Bit-Rate Allocation for Primary and Partial Redundant Frame Coding

Primary Frame Bit-Rate Reduction

A measure of compressibility of the primary frame is used to determine which frames can best be coded at a reduced frame rate. For TCX frame the 9.6 kpbs setup is applied for WB as well as for SWB. For ACELP the following apply. The coding mode decision coming from the signal classification algorithm is first checked. Speech frames classified for Unvoiced Coding (UC) or Voiced Coding (VC) are suitable for compression. For Generic Coding (GC) mode, the correlation (at pitch lag) between adjacent sub-frames within the frame is used to determine compressibility. Primary frame coding of upper band signal (i.e., from 6.4 to 14.4 kHz in SWB and 6.4 to 8 kHz in WB) in channel aware mode uses time-domain bandwidth extension (TBE). For SWB TBE in channel aware mode, a scaled down version of the non-channel aware mode framework is used to obtain a reduction of bits used for the primary frame. The LSF quantization is performed using an 8-bit vector quantization in channel aware mode while a 21-bit scalar quantization based approach is used in non-channel aware mode. The SWB TBE primary frame gain parameters in channel aware mode are encoded similar to that of non-channel aware mode at 13.2 kbps, i.e., 8 bits for gain parameters. The WB TBE in channel aware mode uses similar encoding as used in 9.6 kbps WB TBE of non-channel aware mode, i.e., 2 bits for LSF and 4 bits for gain parameters.

Partial Redundant Frame Coding

The size of the partial redundant frame is variable and depends on the characteristics of the input signal. Also criticality measure is an important metric. A frame is considered as critical to protect when loss of the frame would cause significant impact to the speech quality at the receiver. The criticality also depends on if the previous frames were lost or not. For example, a frame may go from being non-critical to critical if the previous frames were also lost. Parameters computed from the primary copy coding such as coder type classification information, subframe pitch lag, factor M etc are used to measure the criticality of a frame. The threshold, to determine whether a particular frame is critical or not, is a configurable parameter at the encoder which can be dynamically adjusted depending on the network conditions. For example, under high FER conditions it may be desirable to adjust the threshold to classify more frames as critical. Partial frame coding of upper band signal relies on coarse encoding of gain parameters and interpolation/extrapolation of LSF parameters from primary frame. The TBE gain parameters estimated during the primary frame encoding of the (n−FEC offset)-th frame is re-transmitted during the n-th frame as partial copy information. Depending on the partial frame coding mode, i.e., GENERIC or VOICED or UNVOICED, the re-transmission of the gain frame, uses different quantization resolution and gain smoothing.

The following sections describe the different partial redundant frame types and their composition.

Construction of Partial Redundant Frame for Generic and Voiced Coding Modes

In the coding of the redundant version of the frame, a factor M is determined based on the adaptive and fixed codebook energy.

$$M = \frac{(E(ACB) + E(FCB) / E(ACB) - E(FCB)) + 1}{4}$$

In this equation, E(ACB) denotes the adaptive codebook energy and E(FCB) denotes the fixed codebook energy. A low value of M indicates that most of the information in the current frame is carried by the fixed codebook contribution. In such cases, the partial redundant copy (RF_NOPRED) is constructed using one or more fixed codebook parameters only (FCB pulses and gain). A high value of M indicates that most of the information in the current frame is carried by the adaptive codebook contribution. In such cases, the partial redundant copy (RF_ALLPRED) is constructed using one or more adaptive codebook parameters only (pitch lag and gain). If M takes mid values then a mixed coding mode is selected where one or more adaptive codebook parameters and one or more fixed codebook parameters are coded (RF_GENPRED). Under Generic and Voiced Coding modes, the TBE gain frame values are typically low and demonstrate less variance. Hence a coarse TBE gain frame quantization with gain smoothing is used.

Construction of Partial Redundant Frame for Unvoiced Coding Mode

The low bit-rate Noise Excited Linear Prediction coding scheme is used to construct a partial redundant copy for an unvoiced frame type (RF_NELP). In Unvoiced coding mode, the TBE gain frame has a wider dynamic range. To preserve this dynamic range, the TBE gain frame quantization in Unvoiced coding mode uses a similar quantization range as that of the one used in the primary frame.

Construction of Partial Redundant Frame for TCX Frame

In case of TCX partial redundant frame type, a partial copy consisting of some helper parameters is used to enhance the frame loss concealment algorithm. There are three different partial copy modes available, which are RF_TCXFD, RF_TCXTD1 and RF_TCX_TD2. Similar to the PLC mode decision on the decoder side, the selection of the partial copy mode for TCX is based on various parameters such as the mode of the last two frames, the frame class, LTP pitch and gain.

Frequency Domain Concealment (RF TCXFD) Partial Redundant Frame Type 29 bits are used for the RF_TCXFD partial copy mode.

13 bits are used for the LSF quantizer which is the same as used for regular low rate TCX coding.

The global TCX gain is quantized using 7 bits.

The classifier info is coded on 2 bits.

Time Domain Concealment (RF TCXTD1 and RF TCXTD2) Partial Redundant Frame Type

The partial copy mode RF_TCXTD1 is selected if the frame contains a transient or if the global gain of the frame is much lower than the global gain of the previous frame. Otherwise RF_TCXTD2 is chosen.

Overall 18 bits of side data are used for both modes.

9 bits are used to signal the TCX LTP lag 2 bits for signalling the classifier info RF NO DATA Partial Redundant Frame Type This is used to signal a configuration where the partial redundant copy is not sent and all bits are used towards primary frame coding.

The primary frame bit-rate reduction and partial redundant frame coding mechanisms together determine the bit-rate allocation between the primary and redundant frames to be included within a 13.2 kbps payload.

Decoding

At the receiver, the de-jitter buffer provides a partial redundant copy of the current lost frame if it is available in any of the future frames. If present, the partial redundant information is used to synthesize the lost frame. In the decoding, the partial redundant frame type is identified and decoding performed based on whether only one or more adaptive codebook parameters, only one or more fixed codebook parameters, or one or more adaptive codebook parameters and one or more fixed codebook parameters, TCX frame loss concealment helper parameters, or Noise Excited Linear Prediction parameters are coded. If current frame or previous frame is a partial redundant frame, the decoding parameter of current frame such as LSP parameters, the gain of adaptive codebook, fix codebook or the BWE gain, is firstly obtained and then post-processed according to decoding parameters, classification information or spectral tilt from previous frames of current frame, or future frames of current frame. The post-processed parameters are used to reconstruct the output signal. Finally, the frame is reconstructed based on the coding scheme. The TCX partial info is decoded, but in contrast to ACELP partial copy mode, the decoder is run in concealment mode. The difference to regular concealment is just that the parameters available from the bitstream are directly used and not derived by concealment.

Channel Aware Mode Encoder Configurable Parameters

The channel aware mode encoder may use the following configurable parameters to adapt its operation to track the channel characteristics seen at the receiver. These parameters maybe computed at the receiver and communicated to the encoder via a receiver triggered feedback mechanism.

Optimal partial redundancy offset (°): The difference in time units between the transmit time of the primary copy of a frame (n) and the transmit time of the redundant copy of that frame which is piggy backed onto a future frame (n+X) is called the FEC offset X. The optimal FEC offset is a value which maximizes the probability of availability of a partial redundant copy when there is a frame loss at the receiver.

Frame erasure rate indicator (p) having the following values: LO(low) for FER rates <5% or HI (high) for FER>5%. This parameter controls the threshold used to determine whether a particular frame is critical or not. Such an adjustment of the criticality threshold is used to control the frequency of partial copy transmission. The HI setting adjusts the criticality threshold to classify more frames as critical to transmit as compared to the LO setting.

It is noted that these encoder configurable parameters are optional with default set to p=HI and °=3.

Second EVS-Embodiment

The following description passages describe an exemplary embodiment of the inventive concept which is used in packet-switched networks, such as Voice-over-IP (VoIP), Voice-over-LTE (VoLTE) or Voice-over-WiFi (VoWiFi).

A highly error resilient mode of the newly standardized 3GPP EVS speech codec is described. Compared to the AMR-WB codec and other conversational codecs, the EVS channel aware mode offers significantly improved error resilience in voice communication over packet-switched networks such as Voice-over-IP (VoIP) and Voice-over-LTE (VoLTE). The error resilience is achieved using a form of in-band forward error correction. Source-controlled coding techniques are used to identify candidate speech frames for bitrate reduction, leaving spare bits for transmission of partial copies of prior frames such that a constant bit rate is maintained. The self-contained partial copies are used to improve the error robustness in case the original primary frame is lost or discarded due to late arrival. Subjective evaluation results from ITU-T P.800 Mean Opinion Score (MOS) tests are provided, showing improved quality under channel impairments as well as negligible impact to clean channel performance.

Introduction

In packet-switched networks, packets may be subjected to varying scheduling and routing conditions, which results in time-varying end-to-end delay. The delay jitter is not amenable to most conventional speech decoders and voice post-processing algorithms that typically expect the packets to be received at fixed time intervals. Consequently, a de-jitter buffer (also referred to as Jitter Buffer Management (JBM) [8], [13]) is typically used in the receiving terminal to remove jitter and deliver packets to the decoder in the correct sequential order.

The longer the de-jitter buffer, the better its ability to remove jitter and the greater the likelihood that jitter can be tolerated without discarding packets due to late arrival (or, buffer underflow). However, end-to-end delay is a key determiner of call quality in conversational voice networks, and the ability of the JBM to absorb jitter without adding excessive buffering delay is an important requirement. Thus, a trade-off exists between JBM delay and the jitter induced packet loss at the receiver. JBM designs have evolved to offer increasing levels of performance while maintaining minimal average delay [8]. Aside from delay jitter, the other primary characteristic of packet-switched networks is the presence of multiple consecutive packet losses (error bursts), which are more commonly seen than on circuit switched networks. Such bursts can result from bundling of packets at different network layers, scheduler behavior, poor radio frequency coverage, or even a slow-adapting JBM. However, the de-jitter buffer—an essential component for VoIP—can be leveraged for improved underflow prevention and more sophisticated packet loss concealment [8]. One such technique is to use forward error correction by transmitting encoded information redundantly for use when the original information is lost at the receiver.

Channel Aware Mode in the EVS Codec

The EVS Channel Aware mode introduces a novel technique for transmitting redundancy in-band as part of the codec payload in a constant bitrate stream, and is implemented for wideband (WB) and super-wideband (SWB) at 13.2 kbps. This technique is in contrast to prior codecs, for which redundancy is typically added as an afterthought by defining mechanisms to transmit redundancy at the transport layer. For example, the AMR-WB RTP payload format allows for bundling of multiple speech frames to include redundancy into a single RTP payload [9]. Alternatively, RTP packets containing single speech frames can be simply re-transmitted at a later time.

Figure 7:
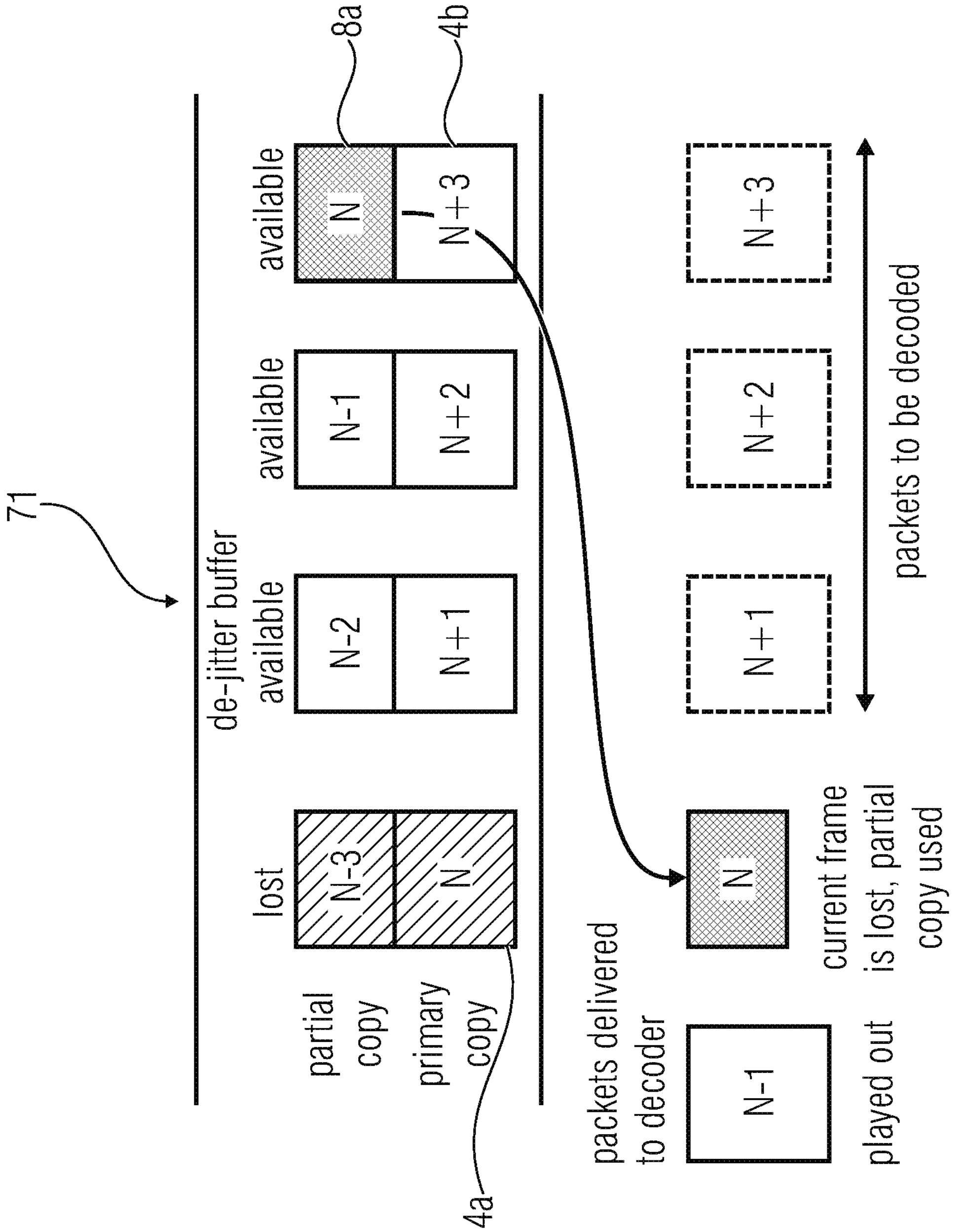
FIG. 7 shows a schematic representation of an embodiment showing a concept of partial redundancy in channel aware mode.

FIG. 7 depicts the concept of partial redundancy in the EVS channel aware mode. The idea is to encode and transmit the partial redundant copy 8*a* associated with the N-th frame, along with the primary encoding 4*b* of the (N+K)-th frame. The offset parameter, K, which determines the separation between the primary 4 and partial frames 8 is also transmitted along with the partial copy 8. In the packet-switched network, if the N-th frame 4*a* packet is lost, then the de-jitter buffer 71 is inspected for the availability of future packets. If available, then the transmitted offset parameter is used to identify the appropriate future packet for partial copy extraction and synthesis of the lost frame. An offset of 3 is used as an example to show the process in FIG. 7. The offset parameter can be a fixed value or can be configured at the encoder based on the network conditions. Including the redundancy in-band in EVS Channel Aware mode allows the transmission of redundancy to be either channel-controlled (e.g., to combat network congestion) or source-controlled. In the latter case, the encoder can use properties of the input source signal to determine the frames that are most critical for high quality reconstruction and selectively transmit redundancy for those frames only. Furthermore, the encoder can also identify the frames that can be best coded at a reduced bitrate in order to accommodate the attachment of redundancy while keeping the bit-stream at a constant 13.2 kbps rate. These new techniques significantly improve the performance under degraded channel conditions while maintaining the clean channel quality.

Channel Aware Encoding

Figure 8:
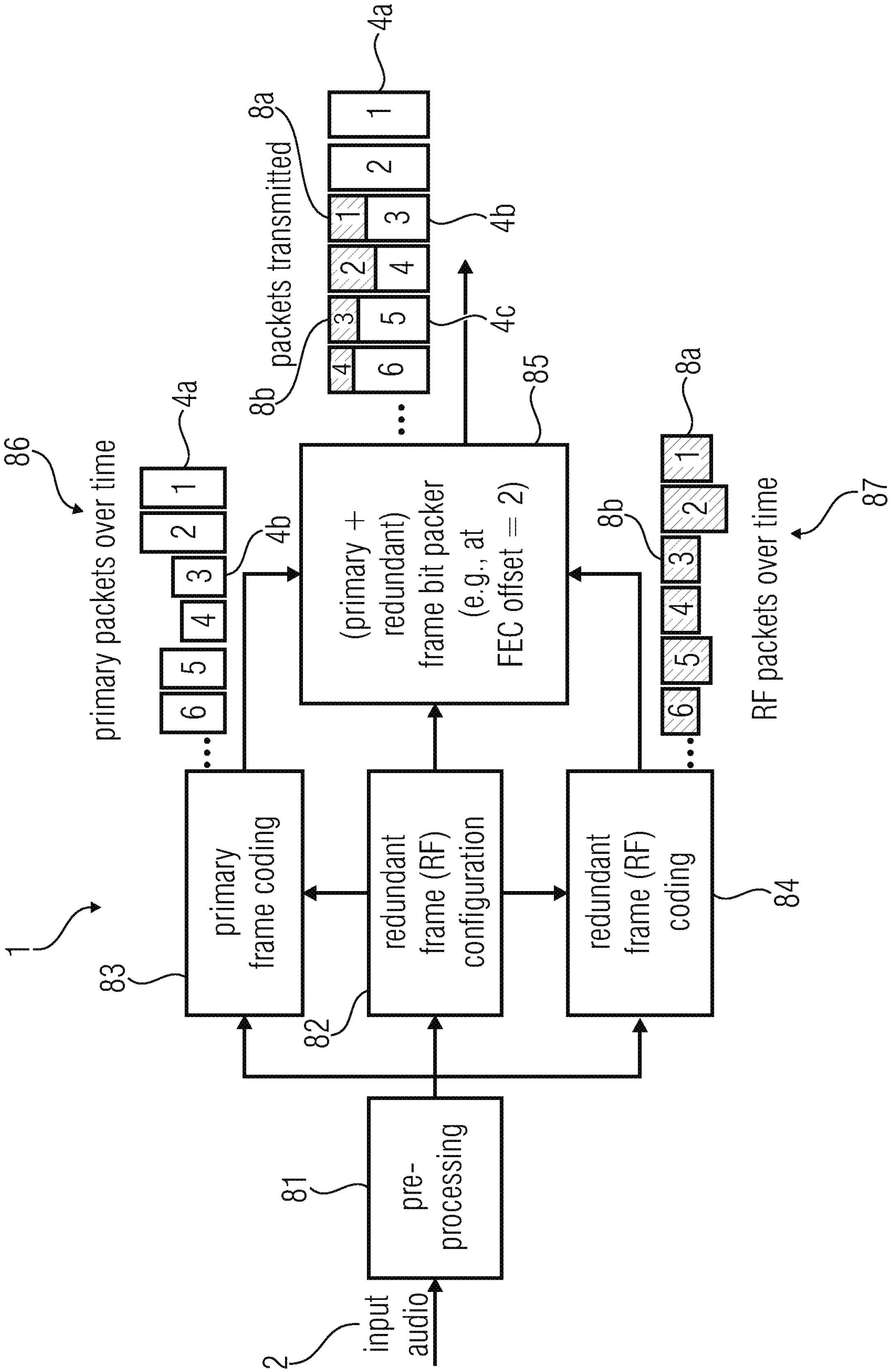
FIG. 8 shows a schematic representation of an embodiment showing a channel aware encoder framework.

FIG. 8 shows a high level description of the channel aware encoder 1. The input audio 2 that is sampled at either 16 kHz (WB) or 32 kHz (SWB) is segmented into frames of 20 msec. A "pre-processing" stage 81 is used to resample the input frame to 12.8 kHz and perform steps such as voice activity detection (VAD) and signal classification [16]. Based on certain analysis parameters (e.g., normalized correlation, VAD, frame type, and pitch lag), the "Redundant frame (RF) configuration" module 82 determines:

1. the compressibility of the current frame 4*b*, i.e., if the current frame 4*b* can allow for bitrate reduction, with minimal perceptual impact, to enable the inclusion of a partial copy 8*a* associated with a previous frame 4*a*, and
2. the RF frame type classification which controls the number of bits needed to faithfully reconstruct the current frame 4*b* through the partial copy 8*b* that is transmitted in a future frame 4*c*. In FIG. 8, the partial copy 8*b* is transmitted along with a future primary copy 4*c* at a frame erasure concealment (FEC) offset of 2 frames.

Strongly-voiced and unvoiced frames are suitable for carrying partial copies of a previous frame with negligible perceptual impact to the primary frame quality. If the current frame is allowed to carry the partial copy, it is signaled by setting RfFlag in the bit stream to 1, or 0 otherwise. If the RfFlag is set to 1, then the number of bits, $B_{primary}$, available to encode the current primary frame is determined by compensating for the number of bits, BRF, already used up by the accompanying partial copy, i.e., $B_{primary}$=264—BRF at 13.2 kbps constant total bit rate. The number of bits, BRF, can range from 5 to 72 bits depending on frame criticality and RF frame type (Section 3.2).

Primary Frame Coding

The "primary frame coding" module 83 shown in FIG. 8, uses the ACELP coding technology [21], [23] to encode the low band core up to 6.4 kHz while the upper band that is beyond 6.4 kHz and up to the Nyquist frequency is encoded using the Time-domain Bandwidth Extension (TBE) technology [17]. The upper band is parameterized into LSPs and gain parameters to capture both the temporal evolution per sub-frame as well as over an entire frame [17]. The "primary frame coding" module 83 also uses the MDCT-based Transform Coded Excitation (TCX) and Intelligent Gap Filling (IGF) coding technologies [11], [18] to encode the background noise frames and mixed/music content more efficiently. An SNR-based open-loop classifier [22] is used to decide whether to choose the ACELP/TBE technology or the TCX/IGF technology to encode the primary frame.

Dietz et al., [16] give an overview of various advancements to the EVS primary modes that further improve the coding efficiency of the ACELP technology beyond the 3GPP AMR-WB coding efficiency [21]. The EVS Channel Aware mode leverages these ACELP and TCX core advancements for primary frame encoding. Additionally, as the partial copy uses varying number of bits across frames, the primary frame encoding also needs to correspondingly accommodate for an adaptive bit allocation.

Redundant Frame Coding

The "redundant frame (RF) coding" module 84 performs compact re-encoding of only those parameters that are critical to protect. The set of critical parameters are identified based on the frame's signal characteristics and are re-encoded at a much lower bitrate (e.g., less than 3.6 kbps). The "bit packer" module 85 arranges the primary frame bit-stream 86 and the partial copy 87 along with certain RF parameters such as RF frame type and FEC offset (see Table I) at fixed locations in the bit-stream.

TABLE I

BIT ALLOCATION FOR CHANNEL AWARE CODING AT 13.2 KBPS

| | | Core coder | | |
|---|---|---|---|---|
| | | ACELP Bandwidth | | |
| | | WB | SWB | TCX/IGF |
| Signalling information (bwidth, coder type, $Rf_{Flag}$) | | | 5 | |
| Primary frame | Core | 181-248 | 169-236 | 232-254 |
| | TBE | 6 | 18 | |
| Partial frame | Core | 0-62 | 0-62 | 0-22 |
| | TBE | 0-5 | 0-5 | |
| | FEC offset | | 2 | |
| | RF frame type | | 3 | |

A frame is considered as critical to protect when loss of that frame would cause significant impact to the speech quality at the receiver. The threshold to determine whether a particular frame is critical or not is a configurable parameter at the encoder, which can be dynamically adjusted depending on the network conditions. For example, under high FER conditions it may be desirable to adjust the threshold to classify more frames as critical. The criticality may also depend on the ability to quickly recover from the loss of a previous frame. For example if the current frame depends heavily on the previous frame's synthesis, then the current frame may get re-classified from being non-critical to critical in order to arrest the error propagation in case the previous frame were to be lost at the decoder.

a) ACELP Partial Frame Encoding

For ACELP frames, the partial copy encoding uses one of the four RF frame types, RF_NOPRED, RF_ALLPRED, RF_GENPRED, and RF_NELP depending on the frame's signal characteristics. Parameters computed from the primary frame coding such as frame type, pitch lag, and factor T are used to determine the RF frame type and criticality, where $$\tau = 0.25\left(\frac{E_{ACB} - E_{FCB}}{E_{ACB} + E_{FCB}} + 1\right)$$

$E_{ACB}$ denotes the adaptive codebook (ACB) energy, and $E_{FCB}$ denotes the fixed codebook (FCB) energy. A low value of $\tau$ (e.g., 0.15 and below) indicates that most of the information in the current frame is carried by the FCB contribution. In such cases, the RF_NOPRED partial copy encoding uses one or more FCB parameters (e.g., FCB pulses and gain) only. On the other hand, a high value of $\tau$ (e.g., 0.35 and above) indicates that most of the information in the current frame is carried by the ACB contribution. In such cases, the RF_ALLPRED partial copy encoding uses one or more ACB parameters (e.g., pitch lag and gain) only. If T is in the range of [0.15, 0.35], then a mixed coding mode RF_GENPRED uses both ACB and FCB parameters for partial copy encoding. For the UNVOICED frames, low bitrate noise-excited linear prediction (NELP) [16] is used to encode the RF_NELP partial copy. The upper band partial copy coding relies on coarse encoding of gain parameters and extrapolation of LSF parameters from the previous frame [11].

b) TCX Partial Frame Encoding

In order to get a useful TCX partial copy, many bits would have to be spent for coding the MDCT spectral data, which reduces the available number of bits for the primary frame significantly and thus degrades the clean channel quality. For this reason, the number of bits for TCX primary frames is kept as large as possible, while the partial copy carries a set of control parameters, enabling a highly guided TCX concealment.

The TCX partial copy encoding uses one of the three RF frame types, RF_TCXFD, RF_TCXTD1, and RF_TCXTD2. While the RF_TCXFD carries control parameters for enhancing the frequency-domain concealment, the RF_TCXTD1 and RF_TCXTD2 are used in time-domain concealment [20]. The TCX RF frame type selection is based on the current and previous frame's signal characteristics, including pitch stability, LTP gain and the temporal trend of the signal. Certain critical parameters such as the signal classification, the LSPs, the TCX gain and pitch lag are encoded in the TCX partial copy.

In background noise or in inactive speech frames, a non-guided frame erasure concealment is sufficient to minimize the perceptual artifacts due to lost frames. An RF_NO_DATA is signaled indicating the absence of a partial copy in the bit-stream during the background noise. In addition, the first TCX frame after a switch from ACELP frame, also uses an RF_NODATA due to lack of extrapolation data in such a coding type switching scenario.

Channel Aware Decoding

Figure 9:
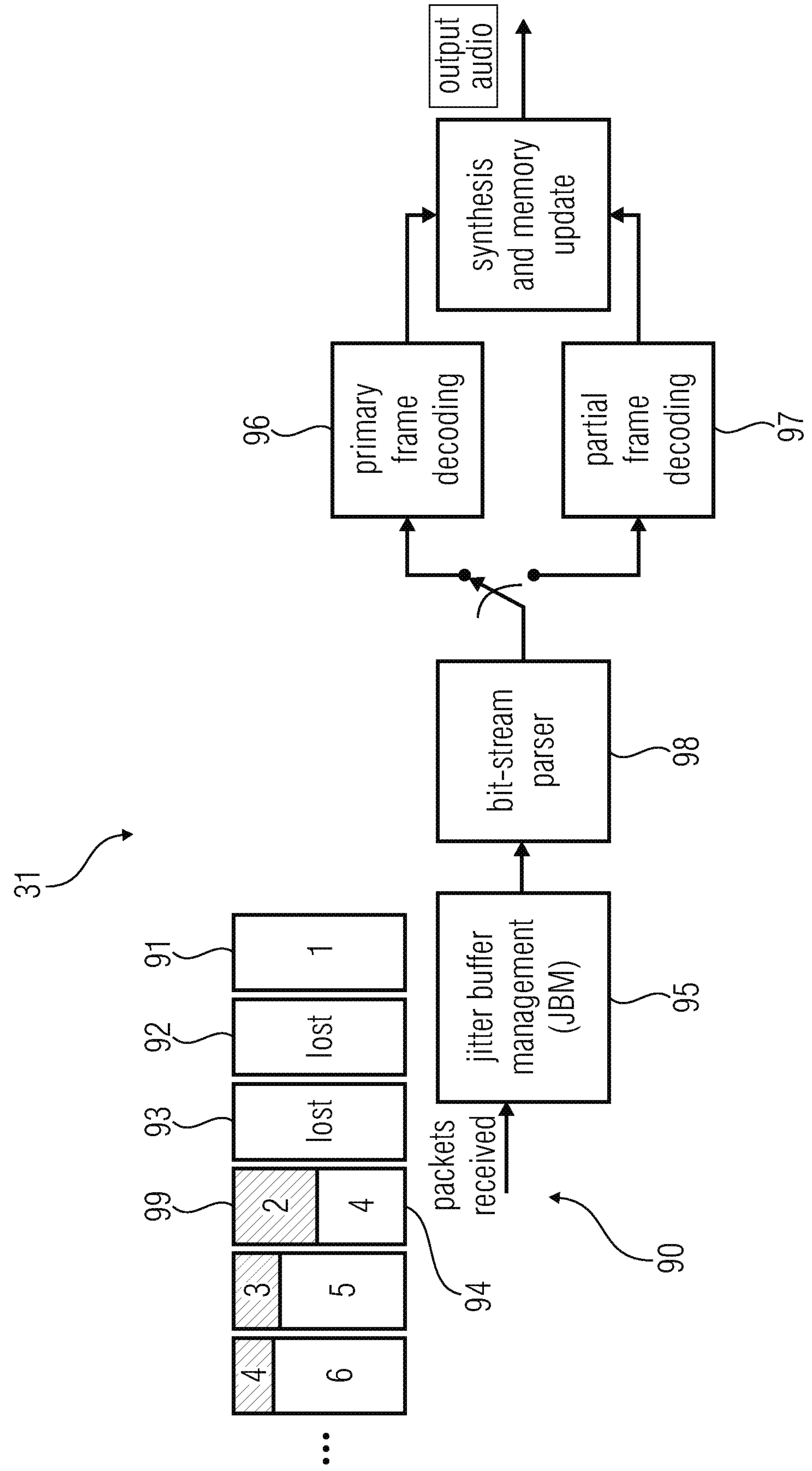
FIG. 9 shows a schematic representation of an embodiment showing a channel aware decoder framework.

FIG. 9 represents a high level depiction of the channel aware decoder 31. At the receiver 90, if the current frame 91 is not lost, the JBM 95 provides the packet for "primary frame decoding" 96 and disregards any RF (Redundant Frame) information present in the packet. In case the current frame is lost, and a future frame 94 is available in the de-jitter buffer, then the JBM 95 provides the packet for "partial frame decoding" 97. If a future frame 93 is not available in the de-jitter buffer, then a non-guided erasure concealment [20] is performed.

Interface with JBM

As described earlier, if the N-th frame is not available (lost or delayed) at the play-out time, the JBM is checked for the availability of a future (N+K)-th frame that contains the partial redundancy of the current frame where $K \in \{2, 3, 5, 7\}$. The partial copy of a frame typically arrives after the primary frame. JBM delay adaptation mechanisms are used to increase the likelihood of availability of partial copies in the future frames, especially for higher FEC offsets of 5 and 7. The EVS JBM conforms to the delay-jitter requirements specified by the 3GPP TS 26.114 [10] for all the EVS modes including the channel aware mode.

In addition to the above described functionality, the EVS JBM [13] computes the channel error rate and an optimum FEC offset, K, that maximizes the availability of the partial redundant copy based on the channel statistics. The computed optimum FEC offset and the channel error rate can be transmitted back to the encoder through a receiver feedback mechanism (e.g., through a codec mode request (CMR) [9]) to adapt the FEC offset and the rate at which the partial redundancy is transmitted to improve the end user experience.

ACELP and TCX Partial Frame Decoding

The "bit-stream parser" module 98 in FIG. 9 extracts the RF frame type information and passes the partial copy information to the "partial frame decoding" module 97. Depending on the RF frame type, if the current frame corresponds to an ACELP partial copy, then the RF parameters (e.g., LSPs, ACB and/or FCB gains, and upper band gain) are decoded for ACELP synthesis. ACELP partial copy synthesis follows similar steps to that of the primary frame decoding 96 except that the missing parameters (e.g., certain gains and pitch lags are only transmitted in alternate subframes) are extrapolated.

Furthermore, if the previous frame used a partial copy for synthesis, then a post-processing is performed in the current frame for a smoother evolution of LSPs and temporal gains. The post-processing is controlled based on the frame type (e.g., VOICED or UNVOICED) and spectral tilt estimated in the previous frame. If the current frame corresponds to a TCX partial copy, then the RF parameters are used to perform a highly-guided concealment.

Subjective Quality Tests

Extensive testing of the EVS channel aware mode has been conducted via subjective ITU-T P.800 Mean Opinion Score (MOS) tests conducted at an independent test laboratory with 32 naïve listeners. The tests were conducted for both WB and SWB, using absolute category rating (ACR) and degradation category rating (DCR) test methodologies [24], respectively. Since the channel aware mode is specifically designed to improve performance for VoLTE networks, evaluating the performance in such networks is critical for establishing the potential benefits. Therefore, testing was conducted using codec outputs from simulations in which VoLTE-like patterns of packet delays and losses were applied to received RTP packets before insertion into the de-jitter buffer. Four of these patterns—or, delay-loss profiles—were derived from real-world call logs of RTP packet arrival times collected in VoLTE networks in South Korea and the United States.

The resulting profiles mimic closely VoLTE network characteristics under different channel error conditions. In deriving the profiles, characteristics such as jitter, temporal evolution of jitter, and burstiness of errors were considered. These four profiles are identified in FIG. 10 as profiles 7, 8, 9 and 10, and correspond to frame erasure rates (FER) at the decoder of approximately 3%, 6%, 8%, and 10%, respectively. These same four profiles have also been selected by 3GPP for use by that body for its own characterization testing of the EVS channel aware mode under channel impairments.

In addition to the VoLTE profiles, all codecs considered here were tested under error-free conditions and also for an HSPA profile included in the 3GPP MTSI specification [10] that yields about 6% frame erasure rate at the decoder. In all of the experiments, the EVS conditions used the reference EVS de-jitter buffer [13]. The AMR-WB conditions used a fixed delay buffer to convert delay-loss profiles to packet-loss profiles, such that packets experiencing a delay greater than a fixed threshold are discarded as described in the EVS performance requirements specification [14].

Figure 10:
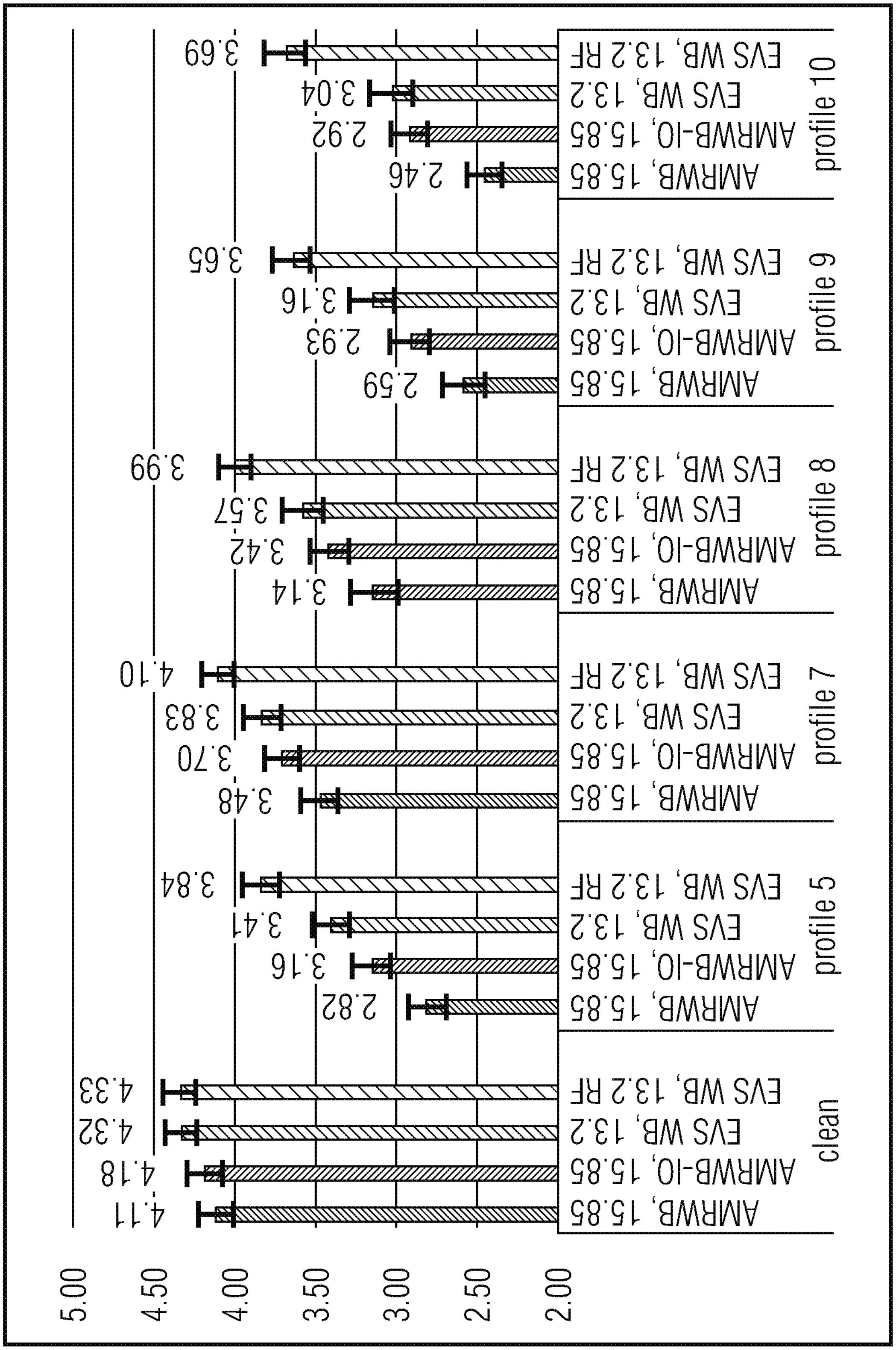
FIG. 10 shows a diagram representing Wideband ITU-T P.800 ACR MOS test results.

The ACR scores for the WB case are shown in FIG. 10. For each profile, starting with the error-free ("Clean") profile, the chart compares (from left to right) AMR-WB, EVS AMR-WB IO mode, EVS baseline WB, and EVS WB channel aware ("RF"). The AMR-WB and EVS AMR-WB IO conditions used a higher bit rate of 15.85 kbps, whereas both EVS conditions used the same 13.2 kbps rate. These results show that the channel aware mode provides a statistically significant improvement compared to the non-channel-aware mode under all frame erasure conditions, even while maintaining equivalent quality under error-free conditions. Notably, the channel aware mode quality degrades much more gracefully even out to the 10% FER of profile 10. Compared to the AMR-WB and AMR-WB-IO conditions, the quality benefit is even more dramatic at these FER rates and has the potential to restore intelligibility under periods of high loss as might be encountered during a handoff, poor radio conditions, edge of the cell scenarios, or even on best-effort networks [8].

Figure 11:
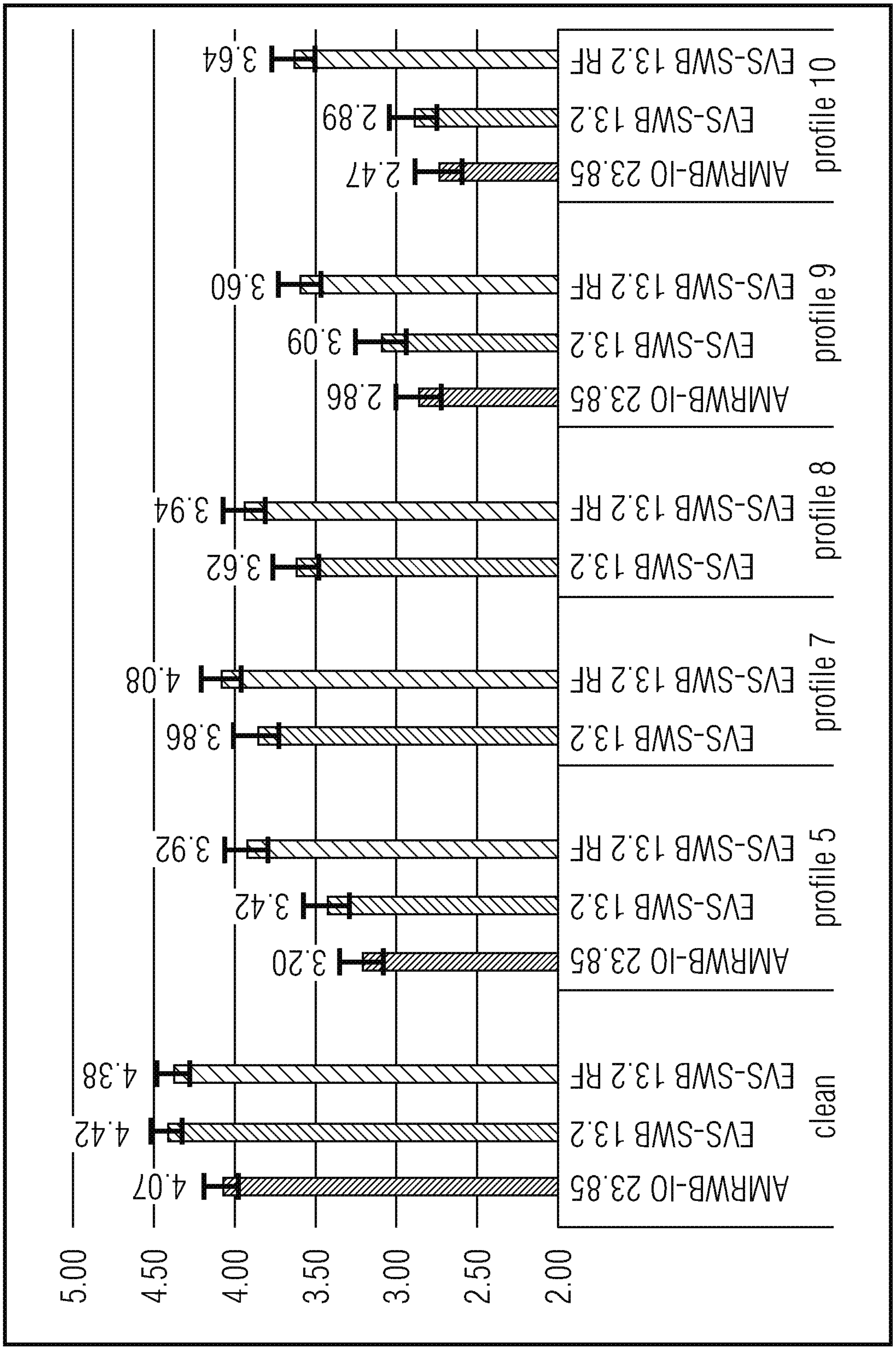
FIG. 11 shows a diagram representing Super-wideband ITU-T P.800 DCR MOS test results

The performance advantage of the channel aware mode is similarly compelling in the super-wideband mode, the results for which are shown in FIG. 11. As with WB, the channel aware mode does not degrade performance under error-free conditions, but has a statistically significant performance benefit under each of the lossy profiles, with the degree of improvement increasing as error rate increases. FIG. 11 also shows the substantial improvement of EVS SWB Channel Aware mode at 13.2 kb/s compared to AMR-WB-IO at its maximum rate of 23.85 kb/s.

CONCLUSIONS

The Channel Aware coding mode of the new 3GPP EVS codec offers users and network operators a highly error resilient coding mode for VoLTE at a capacity operating point similar to the most widely used bit rates of existing deployed services based on AMR and AMR-WB. The mode gives the codec the ability to maintain high quality WB and SWB conversational voice service even in the presence of high FER that may occur during network congestion, poor radio frequency coverage, handoffs, or in best-effort channels. Even with its graceful quality degradation under high loss, the impact to quality is negligible under low loss or even no-loss conditions. This error robustness offered by the Channel Aware mode further allows for relaxing certain system level aspects such as frequency of re-transmissions and reducing scheduler delays. This in turn has potential benefits such as increased network capacity, reduced signaling overhead and power savings in mobile handsets. Use of the Channel Aware mode, therefore, can be beneficial in most networks without capacity impact to insure high quality communications.

Summarizing, the present invention utilizes the fact that the coder knows about the channel quality, for improving the speech/audio quality under erroneous conditions. In contrast to state of the art channel aware coding, the idea is to not have a partial copy that is just a low bitrate version of the primary encoded frame, but the partial copy consist of multiple key parameters that will enhance drastically the concealment. Therefore the decoder needs to distinguish between regular concealment mode where all parameters are concealed and frameloss mode where the partial copy parameters are available. Special care need to be taken for burst frameloss for cases where the concealment needs to switch between partial and full concealment.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] RTP Payload for Redundant Audio Data", Internet Engineering Task Force, RFC 2198, September 1997
[2] U.S. Pat. No. 6,757,654—"Forward error correction in speech coding", Westerlund, M. and al., 29 June 2004
[3] "Adaptive joint playout buffer and FEC adjustment for Internet telephony" C. Boutremans, J.-Y. Le Boudec, INFOCOM 2003. Twenty-Second Annual Joint Conference of the IEEE Computer and Communications. IEEE Societies; 04/2003
[4] Patent application: AUDIO DECODER AND METHOD FOR PROVIDING A DECODED AUDIO INFORMATION USING AN ERROR CONCEALMENT BASED ON A TIME DOMAIN EXCITATION SIGNAL
[5] Patent application: AUDIO DECODER AND METHOD FOR PROVIDING A DECODED AUDIO INFORMATION USING AN ERROR CONCEALMENT MODIFYING A TIME DOMAIN EXCITATION SIGNAL
[6] 3GPP TS 26.448: "Codec for Enhanced Voice Services (EVS); Jitter Buffer Management".
[7] 3GPP TS 26.442: "Codec for Enhanced Voice Services (EVS); ANSI C code (fixed-point)".
[8] D. J. Sinder, I. Varga, V. Krishnan, V. Rajendran and S. Villette, "Recent Speech Coding Technologies and Standards," in Speech and Audio Processing for Coding, Enhancement and Recognition, T. Ogunfunmi, R. Togneri, M. Narasimha, Eds., Springer, 2014.
[9] J. Sjoberg, M. Westerlund, A. Lakaniemi and Q. Xie, "RTP Payload Format and File Storage Format for the Adaptive Multi-Rate (AMR) and Adaptive Multi-Rate Wideband (AMR-WB) Audio Codecs," April 2007. [Online]. Available: http://tools.ietf.org/html/rfc4867.
[10] 3GPP TS 26.114, "Multimedia Telephony Service for IMS," V12.7.0, September 2014.
[11] 3GPP TS 26.445: "EVS Codec Detailed Algorithmic Description; 3GPP Technical Specification (Release 12)," 2014.
[12] 3GPP, TS 26.447, "Codec for Enhanced Voice Services (EVS); Error Concealment of Lost Packets (Release 12)," 2014.
[13] 3GPP TS 26.448: "EVS Codec Jitter Buffer Management (Release 12)," 2014.
[14] 3GPP Tdoc S4-130522, "EVS Permanent Document (EVS-3): EVS performance requirements," Version 1.4.
[15] S. Bruhn, et al., "Standardization of the new EVS Codec," submitted to IEEE ICASSP, Brisbane, Australia, April, 2015.
[16] M. Dietz, et al., "Overview of the EVS codec architecture," submitted to IEEE ICASSP, Brisbane, Australia, April, 2015.
[17] V. Atti, et al., "Super-wideband bandwidth extension for speech in the 3GPP EVS codec," submitted to IEEE ICASSP, Brisbane, Australia, April, 2015.
[18] G. Fuchs, et al., "Low delay LPC and MDCT-based Audio Coding in EVS," submitted to IEEE ICASSP, Brisbane, Australia, April, 2015.
[19] S. Disch et al., "Temporal tile shaping for spectral gap filling within TCX in EVS Codec," submitted to IEEE ICASSP, Brisbane, Australia, April, 2015.
[20] J. Lecomte et al., "Packet Loss Concealment Technology Advances in EVS," submitted to IEEE ICASSP, Brisbane, Australia, April, 2015.
[21] B. Bessette, et al, "The adaptive multi-rate wideband speech codec (AMR-WB)," IEEE Trans. on Speech and Audio Processing, vol. 10, no. 8, pp. 620-636, November 2002.
[22] E. Ravelli, et al., "Open loop switching decision based on evaluation of coding distortions for audio codecs," submitted to IEEE ICASSP, Brisbane, Australia, April, 2015.
[23]M. Jelínek, T. Vaillancourt, and Jon Gibbs, "G.718: A New Embedded Speech and Audio Coding Standard with High Resilience to Error-Prone Transmission Channels," IEEE Communications Magazine, vol. 47, no. 10, pp. 117-123, October 2009.
[24] ITU-T P.800, "Methods for Subjective Determination of Transmission Quality," International Telecommunication Union (ITU), Series P., August 1996.

The invention claimed is:

1. An apparatus for encoding audio content using at least a TCX (Transform Coded Excitation) coding scheme, wherein the apparatus is configured to provide a primary encoded representation of a current frame and an encoded representation of at least one error concealment helper parameter for providing a decoder-sided guided error concealment of the current frame, wherein the encoded representation of the at least one error concealment helper parameter is transmitted in-band as part of the codec payload, wherein the apparatus is configured to combine the encoded representation of the at least one error concealment helper parameter of the current frame with a primary encoded representation of a future frame into a transport packet such that the encoded representation of the at least one error concealment helper parameter of the current frame is sent with a time delay relative to the primary encoded representation of the current frame, wherein the apparatus is configured to select the at least one error concealment helper parameter based on one or more parameters representing a signal characteristic of the audio content comprised in the current frame, wherein the apparatus is configured to selectively choose between at least two modes for providing an encoded representation of the at least one error concealment helper parameter, wherein one of the at least two modes for providing an encoded representation of the at least one error concealment helper parameter is a time domain concealment mode that is selected if the audio content comprised in the current frame comprises a transient or if the global gain of the audio content comprised in the current frame is lower than the global gain of the preceding frame, and wherein a further one of the at least two modes for providing an encoded representation of the at least one error concealment helper parameter is a frequency domain concealment mode such that the encoded representation of the at least one error concealment helper parameter comprises one or more of an LSF (Line Spectral Frequency) parameter, a TCX (Transform Coded Excitation) global gain and a classifier information, wherein the apparatus is implemented, at least in part, by one or more hardware elements.

2. The apparatus according to claim 1, wherein the decoder-sided guided error concealment is an extrapolation-based error concealment.

3. The apparatus according to claim 1, wherein the selection of a mode for providing an encoded representation of the at least one error concealment helper parameter is based on parameters which comprise at least one of a frame class, a LTP (Long Term Prediction) pitch, a LTP gain and a mode for providing an encoded representation of the at least one error concealment helper parameter of one or more preceding frames.

4. An apparatus for decoding audio content using at least a TCX (Transform Coded Excitation) coding scheme, wherein the apparatus is configured to receive a primary encoded representation of a current frame and/or an encoded representation of at least one error concealment helper parameter for providing a decoder-sided guided error concealment of the current frame, wherein the encoded representation of the at least one error concealment helper parameter is transmitted in-band as part of the codec payload, wherein the apparatus is configured to extract the error concealment helper parameter of a current frame from a packet that is separated from a packet in which the primary encoded representation of the current frame is comprised, wherein the apparatus is configured to use the guided error concealment for at least partly reconstructing the audio content of the current frame by using the at least one error concealment helper parameter in case the primary encoded representation of the current frame is lost, corrupted or delayed, wherein the apparatus is configured to selectively choose between at least two error concealment modes which use different encoded representations of the at least one error concealment helper parameters for at least partially reconstructing the audio content using the guided error concealment, wherein one of the at least two error concealment modes, which uses different encoded representations of the at least one error concealment parameters, is a time domain concealment mode that is selected if the audio content comprised in the current frame comprises a transient or if the global gain of the audio content comprised in the current frame is lower than the global gain of the preceding frame, and wherein a further one of the at least two error concealment modes, which uses different encoded representations of the at least one error concealment helper parameters, is a frequency domain concealment mode wherein the encoded representation of the at least one error concealment helper parameter comprises one or more of an LSF (Line Spectral Frequency) parameter, a TCX global gain and a classifier information, wherein the apparatus is implemented, at least in part, by one or more hardware elements.

5. The apparatus according to claim 4, wherein the decoder-sided guided error concealment is an extrapolation-based error concealment.

6. A system comprising the apparatus for encoding audio content of claim 1 and an apparatus for decoding audio content of claim 4.

7. A method for encoding audio content using a TCX (Transform Coded Excitation) coding scheme, the method comprising:

providing a primary encoded representation of a current frame and an encoded representation of at least one error concealment helper parameter, said error concealment helper parameter for providing a decoder-sided guided error concealment of the current frame, and transmitting the encoded representation of the at least one error concealment helper parameter in-band as part of the codec payload, wherein selecting the at least one error concealment helper parameter based on one or more parameters representing a signal characteristic of the audio content comprised in the current frame, and selectively choosing between at least two modes for providing an encoded representation of the at least one error concealment helper parameter, wherein one of the at least two modes for providing an encoded representation of the at least one error concealment helper parameter is a time domain concealment mode that is selected if the audio content comprised in the current frame comprises a transient or if the global gain of the audio content comprised in the current frame is lower than the global gain of the preceding frame, and wherein a further one of the at least two modes for providing an encoded representation of the at least one error concealment helper parameter is a frequency domain concealment mode such that the encoded representation of the at least one error concealment parameter comprises one or more of an LSF parameter, a TCX global gain and a classifier information.

8. A method for decoding audio content using a TCX (Transform Coded Excitation) coding scheme, the method comprising:

receiving a primary encoded representation of a current frame and/or an encoded representation of at least one error concealment helper parameter, said error concealment helper parameter for providing a decoder-sided guided error concealment of the current frame, wherein the encoded representation of the at least one error concealment helper parameter is transmitted in-band as part of the codec payload, using, at the decoder-side, the guided error concealment for at least partly reconstructing the audio content of the current frame by using the at least one error concealment helper parameter in case the primary encoded representation of the current frame is lost, corrupted or delayed, selectively choosing between at least two error concealment modes which use different encoded representations of the at least one error concealment helper parameters for at least partially reconstructing the audio content using the guided error concealment, wherein one of the at least two error concealment modes, which uses different encoded representations of the at least one error concealment parameters, is a time domain concealment mode that is selected if the audio content comprised in the current frame comprises a transient or if the global gain of the audio content comprised in the current frame is lower than the global gain of the preceding frame, and wherein a further one of the at least two error concealment modes, which uses different encoded representations of the at least one error concealment helper parameters, is a frequency domain concealment mode wherein the encoded representation of the at least one error concealment helper parameter comprises one or more of an LSF parameter, a TCX global gain and a classifier information.

9. A non-transitory digital storage medium having stored thereon a computer program for performing a method of encoding audio content using a TCX (Transform Coded Excitation) coding scheme, the method comprising:

providing a primary encoded representation of a current frame and an encoded representation of at least one error concealment helper parameter, said error concealment helper parameter for providing a decoder-sided guided error concealment of the current frame, and transmitting the encoded representation of the at least one error concealment helper parameter in-band as part of the codec payload, wherein selecting the at least one error concealment helper parameter based on one or more parameters representing a signal characteristic of the audio content comprised in the current frame, and selectively choosing between at least two modes for providing an encoded representation of the at least one error concealment helper parameter, wherein one of the at least two modes for providing an encoded representation of the at least one error concealment helper parameter is a time domain concealment mode that is selected if the audio content comprised in the current frame comprises a transient or if the global gain of the audio content comprised in the current frame is lower than the global gain of the preceding frame, and wherein a further one of the at least two modes for providing an encoded representation of the at least one error concealment helper parameter is a frequency domain concealment mode such that the encoded representation of the at least one error concealment parameter comprises one or more of an LSF parameter, a TCX global gain and a classifier information, when said computer program is run by a computer.

10. A non-transitory digital storage medium having stored thereon a computer program for performing a method of decoding audio content using a TCX (Transform Coded Excitation) coding scheme, the method comprising:

receiving a primary encoded representation of a current frame and/or an encoded representation of at least one error concealment helper parameter, said error concealment helper parameter for providing a decoder-sided guided error concealment of the current frame, wherein the encoded representation of the at least one error concealment helper parameter is transmitted in-band as part of the codec payload, using, at the decoder-side, the guided error concealment for at least partly reconstructing the audio content of the current frame by using the at least one error concealment helper parameter in case the primary encoded representation of the current frame is lost, corrupted or delayed, selectively choosing between at least two error concealment modes which use different encoded representations of the at least one error concealment helper parameters for at least partially reconstructing the audio content using the guided error concealment, wherein one of the at least two error concealment modes, which uses different encoded representations of the at least one error concealment parameters, is a time domain concealment mode that is selected if the audio content comprised in the current frame comprises a transient or if the global gain of the audio content comprised in the current frame is lower than the global gain of the preceding frame, and wherein a further one of the at least two error concealment modes, which uses different encoded representations of the at least one error concealment helper parameters, is a frequency domain concealment mode wherein the encoded representation of the at least one error concealment helper parameter comprises one or more of an LSF parameter, a TCX global gain and a classifier information, when said computer program is run by a computer.

* * * * *